US009503727B2

(12) United States Patent
Seregin et al.

(10) Patent No.: US 9,503,727 B2
(45) Date of Patent: *Nov. 22, 2016

(54) METHOD AND APPARATUS FOR CODING VIDEO AND METHOD APPARATUS FOR DECODING VIDEO, ACCOMPANIED WITH INTRA PREDICTION

(71) Applicant: SAMSUNG ELECTRONICS CO., LTD., Suwon-si (KR)

(72) Inventors: Vadim Seregin, Suwon-si (KR); Il-koo Kim, Osan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/603,079

(22) Filed: Jan. 22, 2015

(65) Prior Publication Data

US 2015/0139298 A1 May 21, 2015

Related U.S. Application Data

(63) Continuation of application No. 14/130,150, filed as application No. PCT/KR2012/005088 on Jun. 27, 2012.

(60) Provisional application No. 61/501,974, filed on Jun. 28, 2011.

(51) Int. Cl.
*H04N 19/159* (2014.01)
*H04N 19/105* (2014.01)
(Continued)

(52) U.S. Cl.
CPC .......... *H04N 19/109* (2014.11); *H04N 19/105* (2014.11); *H04N 19/11* (2014.11);
(Continued)

(58) Field of Classification Search
None
See application file for complete search history.

(56) References Cited

U.S. PATENT DOCUMENTS 7,634,145 B2 * 12/2009 Keith .................. G06F 17/148
382/233
7,933,334 B2 * 4/2011 Kanehara ............ H04N 19/197
375/240.12

(Continued)

FOREIGN PATENT DOCUMENTS

CA 2837952 A1 12/2012
CN 1674680 A 9/2005
(Continued)

OTHER PUBLICATIONS

"Fast Intra Prediction Mode Decision by Adaptively Selecting Fewer Number of Modes", Jamil-Ur-rehman, Zhang Ye, Ajith Kumarayapa, Proceedings of the Sixth International Conference on Machine Learning and Cybernetics, Hong Kong, Aug. 19-22, 2007.*

(Continued)

*Primary Examiner* — Christopher S Kelley
*Assistant Examiner* — Kaitlin A Retallick
(74) *Attorney, Agent, or Firm* — Sughrue Mion, PLLC

(57) ABSTRACT

A video decoding method involving intra prediction includes: parsing a most probable mode (MPM) flag of a block while parsing symbols of the block of an encoded video from a received bitstream; determining whether a predetermined number of a plurality of candidate intra prediction modes are used to predict an intra prediction mode of the block based on the MPM flag; when it is determined that the plurality of candidate intra prediction modes are used based on the MPM flag, determining the plurality of candidate intra prediction modes based on intra prediction modes of a left block and an upper block that are adjacent to the block while restoring the intra prediction mode of the block by using the parsed symbols.

2 Claims, 15 Drawing Sheets

(51) Int. Cl.

| | | |
|---|---|---|
| *H04N 19/176* | (2014.01) | |
| *H04N 19/109* | (2014.01) | |
| *H04N 19/593* | (2014.01) | |
| *H04N 19/11* | (2014.01) | |
| *H04N 19/46* | (2014.01) | |
| *H04N 19/137* | (2014.01) | |
| H04N 19/96 | (2014.01) | |
| H04N 19/44 | (2014.01) | |

(52) U.S. Cl.
CPC ......... *H04N 19/137* (2014.11); *H04N 19/159* (2014.11); *H04N 19/176* (2014.11); *H04N 19/46* (2014.11); *H04N 19/593* (2014.11); H04N 19/44 (2014.11); H04N 19/96 (2014.11)

(56) References Cited

U.S. PATENT DOCUMENTS

| | | | | |
|---|---|---|---|---|
| 8,532,185 | B2* | 9/2013 | Jung | H04N 19/146 375/240.12 |
| 8,837,845 | B2 | 9/2014 | Kim et al. | |
| 2008/0107175 | A1 | 5/2008 | Han et al. | |
| 2009/0161757 | A1 | 6/2009 | Yu et al. | |
| 2010/0118943 | A1* | 5/2010 | Shiodera | H04N 19/105 375/240.12 |
| 2010/0266048 | A1 | 10/2010 | Yang et al. | |
| 2011/0038412 | A1 | 2/2011 | Jung et al. | |
| 2011/0243230 | A1* | 10/2011 | Liu | H04N 19/176 375/240.14 |
| 2012/0008683 | A1* | 1/2012 | Karczewicz | H04N 19/159 375/240.12 |
| 2012/0163455 | A1* | 6/2012 | Zheng | H04N 19/176 375/240.13 |
| 2012/0201303 | A1 | 8/2012 | Yang et al. | |
| 2012/0224777 | A1 | 9/2012 | Kim et al. | |
| 2012/0307894 | A1* | 12/2012 | Chien | H04N 19/176 375/240.12 |
| 2012/0328009 | A1* | 12/2012 | Sasai | H04N 19/197 375/240.12 |
| 2013/0064296 | A1 | 3/2013 | Sun et al. | |
| 2013/0101232 | A1* | 4/2013 | Cohen | H04N 19/70 382/233 |
| 2014/0205006 | A1 | 7/2014 | Jeong et al. | |

FOREIGN PATENT DOCUMENTS

| | | |
|---|---|---|
| CN | 101043632 A | 9/2007 |
| CN | 101115207 A | 1/2008 |
| CN | 101175212 A | 5/2008 |
| CN | 101478672 A | 7/2009 |
| CN | 102045560 A | 5/2011 |
| EA | 2 723 077 A1 | 4/2014 |
| JP | 2006-5438 A | 1/2006 |
| JP | 2009-177352 A | 8/2009 |
| KR | 1020050012762 A | 2/2005 |
| KR | 10-2007-0005848 A | 1/2007 |
| KR | 10-2009-0066035 A | 6/2009 |
| KR | 10-2011-0001885 A | 1/2011 |
| KR | 10-2011-0019855 A | 3/2011 |
| TW | 200516991 A | 5/2005 |
| TW | 200803527 A | 1/2008 |
| WO | 2010/090749 A1 | 8/2010 |
| WO | 2011/021844 A2 | 2/2011 |
| WO | 2011/049396 A2 | 4/2011 |
| WO | 2012172796 A1 | 12/2012 |

OTHER PUBLICATIONS

International Search Report (PCT/ISA/210) issued Jan. 3, 2013, in corresponding International Application No. PCT/KR2012/005088.
Communication dated May 23, 2014 issued by the Korean Intellectual Property Office in counterpart Korean Application No. 10-2012-0069482.
Mei Guo et al., "CE14 Subtest 1: The Most Probable Mode Signaling for Luma", Joint Collaborative Team on Video Coding (JCT-VC), of ITU-T SG16 WP3 and ISO/IEC JTC1/SC29/WG11, JCTVC-E088, Mar. 16-23, 2011, pp. 1-4.
Communication, Issued by the Korean Intellectual Property Office, Dated Aug. 22, 2014, In counterpart Korean Application No. 10-2014-0054357.
Communication, Issued by the Korean Intellectual Property Office, Dated Sep. 3, 2014, In counterpart Korean Application No. 10-2012-0069482.
Written Opinion (PCT/ISA/237) issued Jan. 3, 2013, in corresponding International Application No. PCT/KR2012/005088.
European Search Report dated Jan. 20, 2015, issued in corresponding European Patent Application No. 14192915.8.
Jianle Chen et al., "Simplified context model selection for block level syntax coding," Joint Collaborative Team on Video Coding (JCT-VC) of ITU-T SG16 WP3 and ISO/IEC JTC1/SC29/WG11, 6th Meeting: Torino, IT, Jul. 14-22, 2011.
Joshi R et al., "Description of core experiment 1; Entropy Coding," Joint Collaborative Team on Video Coding (JCT-VC) of ITU-T SG16 WP3 and ISO/IEC JTC1/SC29/WG11, 6th Meeting: Torino, IT, Jul. 13-22, 2011.
Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11 1st Meeting: Dresden, DE, Apr. 15-23, 2010.
Kumakura T et al., "Fixing the number of mpm candidates," Joint Collaborative Team on Video Coding (JCT-VC) of ITU-T SG16 WP3 and ISO/IEC JTC1/SC29/WG11, 6th Meeting: Torino, IT, Jul. 14-22, 2011.
Mei Guo et al., "Improved Intra Mode Coding", Joint Collaborative Team on Video Coding (JCT-VC), of ITU-T SG16 WP3 and ISO/IEC JTC1/SC29/WG11, 4th Meeting: Daegu, Korea, Jan. 20-28, 2011.
Sandeep Kanumuri et al., "CE6.e/f: Planar mode experiments and results," Joint Collaborative Team on Video Coding (JCT-VC) of ITU-T SG16 WP3 and ISO/IEC JTC1/SC29/WG11, 5th Meeting: Geneva, CH, Mar. 16-23, 2011.
Sandeep Kanumuri et al., "Enhancements to intra coding," Joint Collaborative Team on Video Coding (JCT-VC) of ITU-T SG16 WP3 and ISO/IEC JTC1/SC29/WG11, 4th Meeting: Daegu, KR Jan. 20-28, 2011.
Seregin V et al., "Intra mode parsing without access neighbouring information," Joint Collaborative Team on Video Coding (JCT-VC) of ITU-T SG16 WP3 and ISO/IEC JTC1/SC29/WG11, 6th Meeting: Torino, IT, Jul. 14-22, 2011.
Supplemental European Search Report dated Jan. 20, 2015, issued in corresponding European Patent Application No. 12804810.5.
Ugur K et al., "Description of video coding technology proposal by Trandbag, Nokia, Ericsson," Joint Collaborative Team on Video Coding (JCT-VC) of ITU-T SG16 WP3 and ISO/IEC JTC1/SC29/WG11, 1st Meeting: Dresden, DE, Apr. 15-23, 2010.
Wei-Jung Chien et al., "Context modeling of split flag for CABAC," Joint Collaborative Team on Video Coding (JCT-VC) of ITU-T SG16 WP3 and ISO/IEC JTC1/SC29/WG11, 7th Meeting: Geneva, Nov. 21-30, 2011.
Wenpeng Ding et al., "Improved Intra Mode coding by Multiple Mode Candidates," Joint Collaborative Team on Video Coding (JCT-VC), of ITU-T SG16 WP3 and ISO/IEC JTC1/SC29/VVG11, 4th Meeting: Daegu, KR Jan. 20-28, 2011.
Korean Office Action dated May 23, 2014, issued in corresponding Korean Patent Application No. 10-2012-0069482.
Korean Notice of Allowance dated Sep. 3, 2014, issued in corresponding Korean Patent Application No. 10-2012-0069482.
Communication dated Dec. 9, 2014 issued by the Japanese Patent Office in counterpart Japanese Patent Application No. 2014-518797.
Communication issued on Mar. 23, 2015 by the European Patent Office in related Application No. 14192915.8.
Communication dated Sep. 21, 2015, issued by the Australian Intellectual Property Office in counterpart Australian Application No. 2012276454.

(56) References Cited

OTHER PUBLICATIONS

Communication dated Nov. 26, 2015, issued by the Korean Intellectual Property Office in counterpart Korean Application No. 10-2015-0048330.
Communication dated Nov. 26, 2015, issued by the Korean Intellectual Property Office in counterpart Korean Application No. 10-2015-0048331.
Communication dated Nov. 26, 2015, issued by the Korean Intellectual Property Office in counterpart Korean Application No. 10-2015-0048332.
Communication dated Jan. 26, 2016, from the State Intellectual Property Office of People's Republic of China in counterpart Application No. 201510195330.5.
Communication dated Feb. 2, 2016, from the State Intellectual Property Office of People's Republic of China in counterpart Application No. 201510197703.2.
Communication dated Jan. 5, 2016, from the State Intellectual Property Office of People's Republic of China in counterpart Application No. 201510197803.5.
Communication dated Feb. 24, 2016, from the Intellectual Property Office of Taiwan in counterpart application No. 101123240.
Communication dated Jan. 21, 2016, from the Canadian Intellectual Property Office in counterpart application No. 2,840,587.
Communication dated Jun. 3, 2016, from the State Intellectual Property Office of People's Republic of China in counterpart Application No. 201280042660.5.

* cited by examiner

FIG. 13
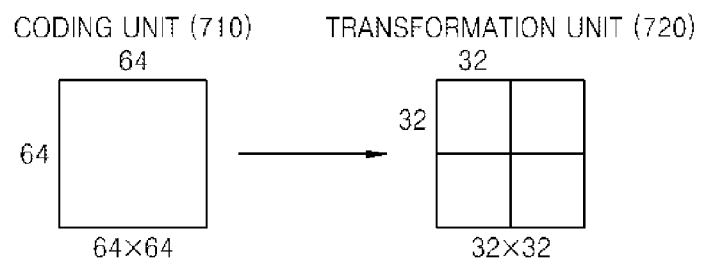
FIG. 14
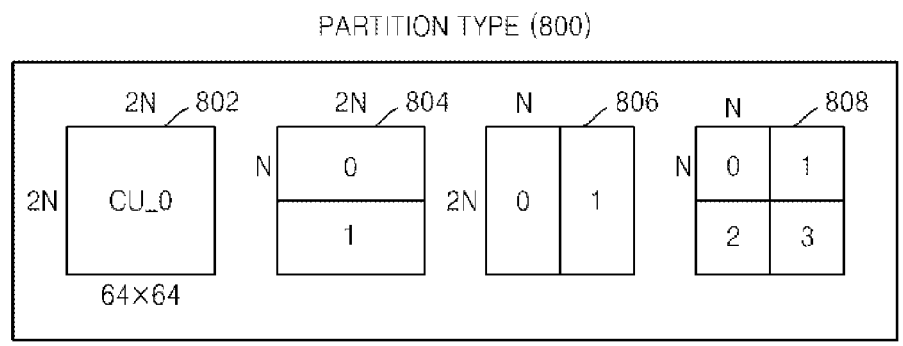
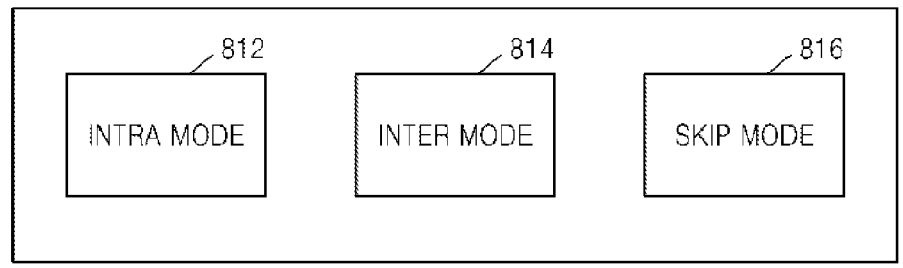
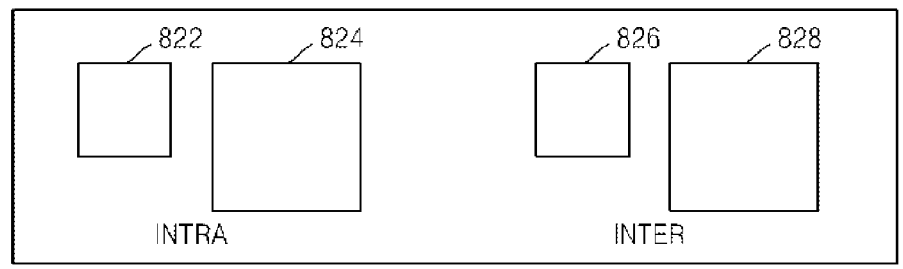

CODING UNIT (1010)

METHOD AND APPARATUS FOR CODING VIDEO AND METHOD APPARATUS FOR DECODING VIDEO, ACCOMPANIED WITH INTRA PREDICTION

CROSS-REFERENCE TO RELATED APPLICATIONS

This application is a Continuation of U.S. patent application Ser. No. 14/130,150, which is a National Stage application under 35 U.S.C. §371 of PCT/KR2012/005088, filed on Jun. 27, 2012, which claims priority from U.S. Provisional Application No. 61/501,974, filed on Jun. 28, 2011, all the disclosures of which are incorporated herein in their entireties by reference.

BACKGROUND

1. Field

Apparatuses and methods consistent with exemplary embodiments relate to encoding and decoding a video by using intra prediction.

2. Description of the Related Art

As hardware for reproducing and storing higher resolution or higher quality video content is being developed and supplied, a need for a video codec for effectively encoding or decoding the higher resolution or higher quality video content is increasing. In a related art video codec, a video is encoded according to a limited encoding method based on a macroblock having a predetermined size.

Image data of a spatial domain is converted into coefficients of a frequency domain by using frequency conversion. A video codec divides an image into blocks of predetermined sizes for rapidly performing the frequency conversion, and performs discrete cosine transformation (DCT) on every block to encode the frequency coefficient of the block unit. It is easier to compress the coefficients of the frequency domain than the image data of the spatial domain. In particular, since image pixel values in the spatial domain may be represented as predicted errors through inter-prediction or intra-prediction of the video codec, a large amount of data may be converted to 0 when performing the frequency conversion on the predicted errors. The video codec reduces a data amount by substituting data that is continuously and repeatedly generated with small-sized data.

SUMMARY

Aspects of one or more exemplary embodiments provide a method and an apparatus for encoding a video, in which predicative encoding is performed in an intra prediction mode, by using intra prediction, and a method and an apparatus for decoding a video.

According to an aspect of an exemplary embodiment, there is provided a video decoding method involving intra prediction, the method including: parsing a most probable mode (MPM) flag of a block while parsing symbols of the block of an encoded video from a received bitstream; determining whether a predetermined number of a plurality of candidate intra prediction modes are used to predict an intra prediction mode of the block based on the MPM flag; when it is determined that the plurality of candidate intra prediction modes are used based on the MPM flag, determining the plurality of candidate intra prediction modes based on intra prediction modes of a left block and an upper block that are adjacent to the block while restoring the intra prediction mode of the block by using the parsed symbols; predicting the intra prediction mode of the block by using the determined plurality of candidate intra prediction modes; and performing the intra prediction on the block by using the predicted intra prediction mode.

The determining of the plurality of candidate intra prediction modes may include determining default intra prediction modes as the plurality of candidate intra prediction modes based on the intra prediction mode of the left block, when the intra prediction modes of the left block and the upper block are the same as each other.

The determining of the plurality of candidate intra prediction modes may include determining the plurality of candidate intra prediction modes by using the intra prediction mode of the left block, when the intra prediction modes of the left block and the upper block are the same as each other.

The determining of the plurality of candidate intra prediction modes may include determining two candidate intra prediction modes from among the plurality of candidate intra prediction modes as the intra prediction modes of the left block and the upper block, when the intra prediction modes of the left block and the upper block are different from each other.

The parsing may include parsing index information representing one of the plurality of candidate intra prediction modes from the bitstream, when it is determined that the plurality of intra prediction modes are used to determine the intra prediction mode of the block based on the MPM flag, and the predicting of the intra prediction mode of the block may include determining one from among the plurality of candidate intra prediction modes, which is selected based on the index information, as the intra prediction mode of the block.

The parsing may include parsing current intra mode information of the block from the bitstream, when it is determined that the intra prediction mode of the block is different from the intra prediction modes of the left block and the upper block based on the MPM flag, and the predicting of the intra prediction mode of the block may include interpreting a relationship between the intra prediction mode of the block and the plurality of candidate intra prediction modes from the parsed current intra mode information of the block, and determining the intra prediction mode of the block based on a result of the interpretation.

According to another aspect of an exemplary embodiment, there is provided a video encoding method involving intra prediction, the method including: comparing an intra prediction mode of a block, which is determined through intra prediction on the block in a video, with intra prediction modes of a left block and an upper block that are adjacent to the block; encoding a most probable mode (MPM) flag representing whether there is an intra prediction mode that is the same as the intra prediction mode of the block between the intra prediction modes of the left block and the upper block; if there is an intra prediction mode that is the same as the intra prediction mode of the block between the intra prediction modes of the left block and the upper block, determining a predetermined number of a plurality of candidate intra prediction modes regardless of whether the intra prediction modes of the left block and the upper block are the same as or different from each other; and encoding current intra mode information of the block, which is determined based on the plurality of candidate intra prediction modes.

The determining of the plurality of candidate intra prediction modes may include determining default intra prediction modes as the plurality of candidate intra prediction modes based on the intra prediction mode of the left block, when the intra prediction modes of the left block and the upper block are the same as each other.

The determining of the plurality of candidate intra prediction modes may include determining the plurality of candidate intra prediction modes by using the intra prediction mode of the left block, when the intra prediction modes of the left block and the upper block are the same as each other.

The determining of the plurality of candidate intra prediction modes may include determining two candidate intra prediction modes from among the plurality of candidate intra prediction modes as the intra prediction modes of the left block and the upper block, when the intra prediction modes of the left block and the upper block are different from each other.

The encoding of the current intra mode information of the block may include encoding index information representing a candidate intra prediction mode corresponding to the intra prediction mode of the block from among the plurality of candidate intra prediction modes, in a case where there is an intra prediction mode that is the same as the intra prediction mode of the block between the intra prediction modes of the left block and the upper block.

The encoding of the current intra mode information of the block may include: determining the current intra mode information of the block, which represents a relationship between the intra prediction mode of the block and the candidate intra prediction modes, when the intra prediction mode of the block is different from the intra prediction modes of the left block and the upper block; and encoding the current intra mode information of the block.

According to another aspect of another exemplary embodiment, there is provided a video decoding apparatus involving intra prediction, the apparatus including: a parsing unit configured to parse a most probable mode (MPM) flag of a block while parsing symbols of the block of an encoded video from a received bitstream, and determine whether a predetermined number of a plurality of intra prediction modes are used to determine the intra prediction mode of the block based on the MPM flag; and an intra prediction unit configured to, when it is determined that the plurality of candidate intra prediction modes are used based on the MPM flag, determine the plurality of candidate intra prediction modes based on intra prediction modes of a left block and an upper block that are adjacent to the block while restoring the intra prediction mode of the block by using the parsed symbols, predict the intra prediction mode of the block by using the determined plurality of candidate intra prediction modes, and perform intra prediction on the block by using the predicted intra prediction mode.

According to another aspect of still another exemplary embodiment, there is provided a video encoding apparatus including: an intra prediction unit configured to perform intra prediction with respect to a block for encoding a video; and a symbol encoding unit configured to encode symbols generated through the intra prediction of the block, wherein the symbol encoding unit compares an intra prediction mode of the block, which is determined through intra prediction on the block in the video, with intra prediction modes of a left block and an upper block that are adjacent to the block, and encodes a most probable mode (MPM) flag representing whether there is an intra prediction mode that is the same as the intra prediction mode of the block between the intra prediction modes of the left block and the upper block, and the symbol encoding unit, if there is an intra prediction mode that is the same as the intra prediction mode of the block between the intra prediction modes of the left block and the upper block, determines a predetermined number of a plurality of candidate intra prediction modes regardless of whether the intra prediction modes of the left block and the upper block are the same as or different from each other, and encodes current intra mode information of the block, which is determined based on the plurality of candidate intra prediction modes.

According to another aspect of still another exemplary embodiment, there is provided a computer readable recording medium having recorded thereon a program for executing the above described method.

The determining of the default intra prediction modes may include determining at least one of an intra prediction mode that has a higher probability of being generated, an intra prediction mode having an improved prediction function, or a mode similar to the left intra prediction mode as the default intra prediction modes.

The determining of the plurality of candidate intra prediction modes may include determining an intra prediction mode of at least one of neighboring blocks except for the left and upper blocks, which is different from the intra prediction modes of the left and upper blocks, as a candidate intra prediction mode.

BRIEF DESCRIPTION OF THE DRAWINGS

The above and other features will become more apparent by describing in detail exemplary embodiments thereof with reference to the attached drawings in which:

FIG. 13 is a diagram for describing a relationship between a coding unit and transformation units according to an exemplary embodiment;

FIG. 14 is a diagram for describing encoding information of coding units corresponding to a coded depth according to an exemplary embodiment;

DETAILED DESCRIPTION

Figure 1:
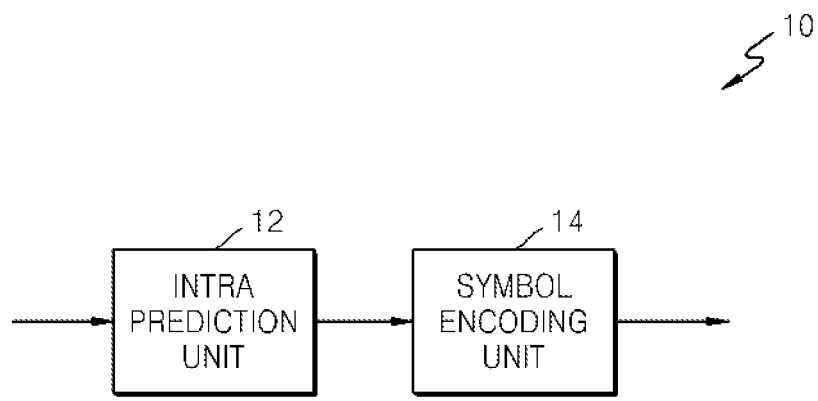
FIG. 1 is a block diagram of an apparatus for encoding a video according to an exemplary embodiment.

Hereinafter, exemplary embodiments will be described more fully with reference to the accompanying drawings, in which like reference numerals refer to like elements throughout.

A video encoding method and a video decoding method based on an intra prediction mode prediction method will be described with reference to FIGS. 1 through 6 according to an exemplary embodiment. In addition, exemplary embodiments where a prediction scheme of the intra prediction mode is used in the video encoding method and the video decoding method based on coding units of a tree structure will be described with reference to FIGS. 7 through 19. Hereinafter, the term 'image' may refer to a still image of a video, or may refer to a moving picture, that is, the video itself.

First, a video encoding method and a video decoding method based on the intra prediction mode prediction method according to an exemplary embodiment will be described with reference to FIGS. 1 through 6.

FIG. 1 is a block diagram of a video encoding apparatus 10 according to an exemplary embodiment.

The video encoding apparatus 10 may encode video data of a spatial domain through intra prediction and/or inter prediction, transformation, quantization, and symbol encoding. Hereinafter, operations for encoding symbols that are generated by intra-prediction of the video encoding apparatus 10 will be described.

The video encoding apparatus 10 includes an intra prediction unit 12 and a symbol encoding unit 14.

The video encoding apparatus 10 of the present embodiment divides image data of a video into a plurality of data units, and may perform encoding on each data unit. The data unit may be formed as a square, a rectangle, or an arbitrary geometrical shape. Exemplary embodiments are not limited to the data unit of a predetermined size. For convenience of description, a video encoding method with respect to a 'block' that is a kind of data unit will be described. However, the video encoding method according to exemplary embodiments is not limited to the video encoding method with respect to the 'block', but may be applied to various data units.

The intra prediction unit 12 performs an intra prediction with respect to blocks of the video. The intra prediction unit 12 may determine an intra prediction mode that represents a direction where reference information is located among neighboring information, for performing the intra prediction with respect to each of the blocks. The intra prediction unit 12 may perform the intra prediction with respect to the current block according to a kind of intra prediction mode.

According to the intra prediction method of the present embodiment, the intra prediction mode of the current block (hereinafter, the current intra prediction mode) may be predicted with reference to intra prediction modes of neighboring blocks. The symbol encoding unit 14 may encode prediction information of the current intra prediction mode.

The symbol encoding unit 12 may compare the current intra prediction mode that is determined through the intra prediction of the current block with intra prediction modes of a left block and an upper block from among the neighboring blocks adjacent to the current block, to predict the current intra prediction mode.

For example, the symbol encoding unit 14 may encode a most probable mode (MPM) flag representing whether there is an intra prediction mode that is substantially the same as the current intra prediction mode from among the intra prediction modes of the left block and the upper block.

For example, if there is a mode that is the same as the current intra prediction mode between the intra prediction modes of the left block and the upper block, the symbol encoding unit 14 may determine a plurality of candidate intra prediction modes, the number of which is fixed when the intra prediction modes of the left block and the upper block are the same as or different from each other. For example, the symbol encoding unit 14 may encode the current intra mode information under an assumption that there are three candidate intra prediction modes for the current intra prediction mode, if there is a mode that is the same as the current intra prediction mode between the intra prediction modes of the left block and the upper block. As another example, the current intra mode information may be encoded under an assumption that there are two candidate intra prediction modes. The symbol encoding unit 14 determines the current intra mode information of the current block based on a plurality of candidate intra prediction modes, and encodes the current intra mode information. The current intra mode information may be index information representing one of the candidate intra prediction modes, or index information representing the current intra mode.

The symbol encoding unit 14 may determine two or more candidate intra prediction modes that are used to predict the current intra prediction mode without considering whether the left intra prediction mode and the upper intra prediction mode are the same, when there is a mode that is the same as the current intra prediction mode between the intra prediction modes of the left block and the upper block. For example, a plurality of candidate intra prediction modes, for example, two, three, or four candidate intra prediction modes, may be used to determine the current intra prediction mode.

In addition, symbols are encoded under an assumption that there are a fixed number of candidate intra prediction modes without considering a case where the number of the candidate intra prediction modes is changed, and thus, the encoding operation of the intra mode may be simplified.

The symbol encoding unit 14 of the present embodiment may determine default intra prediction modes as a plurality of candidate intra prediction modes based on the intra prediction mode of the left block, if the intra prediction modes of the left block and the upper block are the same as each other. According to another exemplary embodiment, the symbol encoding unit 14 may determine a plurality of candidate intra prediction modes by modifying the intra prediction mode of the left block, if the intra prediction modes of the left block and the upper block are the same as each other.

According to an exemplary embodiment, the symbol encoding unit 14 may determine two candidate intra prediction modes from among the plurality of candidate intra prediction modes as the intra prediction modes of the left block and the upper block, respectively, if the intra prediction modes of the left block and the upper block are different from each other.

According to an exemplary embodiment, the symbol encoding unit 14 may encode information representing the candidate intra prediction mode corresponding to the current intra prediction mode, based on the plurality of candidate intra prediction modes.

According to an exemplary embodiment, the symbol encoding unit 14 may encode index information representing the candidate intra prediction mode corresponding to the current intra prediction mode from among the plurality of candidate intra prediction modes, if there is the intra prediction mode that is the same as the intra prediction mode of the current block between the intra prediction modes of the left block and the upper block.

According to an exemplary embodiment, the symbol encoding unit 14 may encode the current intra prediction mode information representing the intra prediction mode of the current block, if the intra prediction mode of the current block is different from those of the left block and the upper block.

According to another embodiment, the symbol encoding unit 14 may encode the current intra mode information representing a relationship between the candidate intra prediction modes and the current intra prediction mode so that the current intra prediction mode may be inferred from the plurality of candidate intra prediction modes, even when the intra prediction mode of the current block is different from the intra prediction modes of the left block and the upper block. In this case, even if the intra prediction mode of the current block is different from the intra prediction modes of the left block and the upper block, the symbol encoding unit 14 determines the plurality of candidate intra prediction modes and encodes the current intra mode information based on the plurality of candidate intra prediction modes.

Therefore, the symbol encoding unit 14 may output current intra mode information, subsequent to the MPM flag that is encoded for the current block.

Also, the symbol encoding unit 14 may encode information representing the number of candidate intra prediction modes.

The symbol encoding unit 14 of the present embodiment may encode a quantized transformation coefficient of residual data that is generated as a result of the intra prediction of the current block.

Therefore, the video encoding apparatus 10 of the present embodiment may encode and output the symbols generated as a result of the intra prediction of the blocks of the video.

The video encoding apparatus 10 of the present embodiment may include a central processor (not shown) for overall controlling the intra prediction unit 12 and the symbol encoding unit 14. Alternatively, the intra prediction unit 12 and the symbol encoding unit 14 are respectively driven by exclusive processors (not shown), and the video encoding apparatus 10 may be driven overall by systematic operations of the processors (not shown). Alternatively, the intra prediction unit 12 and the symbol encoding unit 14 may be controlled by an external processor (not shown) of the video encoding apparatus 10 according to an exemplary embodiment.

According to the present embodiment, the video encoding apparatus 10 may include one or more data storage units (not shown) for storing input/output data of the intra prediction unit 12 and the symbol encoding unit 14. The video encoding apparatus 10 may include a memory controller (not shown) for controlling data input/output of the data storage unit (not shown).

According to the present embodiment, the video encoding apparatus 10 may perform the video encoding operation including the prediction and transformation by operating in connection with a video encoding processor mounted therein or an external video encoding processor to output the video encoding result. The internal video encoding processor in the video encoding apparatus 10 according to an exemplary embodiment may include a video encoding processing module included in the video encoding apparatus 10 or a central calculation device or a graphic calculation device to perform a basic video encoding operation, as well as a separate processor.

Figure 2:
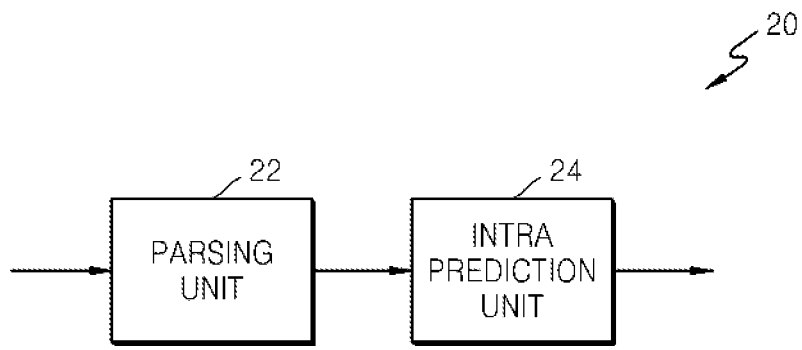
FIG. 2 is a block diagram of an apparatus for decoding a video according to an exemplary embodiment.

FIG. 2 is a block diagram of a video decoding apparatus 20 according to an exemplary embodiment.

The video decoding apparatus 20 may decode video data that is encoded by the video encoding apparatus 10 through parsing, symbol decoding, inverse quantization, inverse transformation, or intra prediction/motion compensation to restore video data that is substantially the same or similar to the original video data of the spatial domain. Hereinafter, processes of parsing symbols for the intra prediction from bit streams and restoring the intra prediction mode from the parsed symbols will be described.

The video decoding apparatus 20 of the present embodiment includes a parsing unit 22 and an intra prediction unit 24.

The video decoding apparatus 20 may receive a bit stream in which encoded data of the video is written. The parsing unit 22 may parses symbols from the bit stream.

The parsing unit 22 of the present embodiment may parse symbols that are generated as an intra prediction result with respect to blocks of the video from the bit stream.

The parsing unit 22 may parse the MPM flags of the blocks during parsing the symbols of the video blocks from the received bit stream.

The parsing unit 22 of the present embodiment may determine whether a fixed number of plurality of candidate intra prediction modes are used to predict an intra prediction mode of a current block based on the parsed MPM flag of the current block.

In a case where the candidate intra prediction modes are used, since a constant number of candidate intra prediction modes are assumed, the parsing unit 22 may parse the current intra mode information without considering a case where the number of the candidate intra prediction modes is changed after parsing the MPM flag. After parsing the symbols relating to the intra prediction of the current block by the parsing unit 22, the intra prediction unit 24 may restore data for the intra prediction, for example, the intra prediction mode of the current block, by using the parsed symbols. The quantized transformation coefficient of the residual data generated as a result of the intra prediction of the current block may be restored from the parsed data by the parsing unit 22.

In a case where it is determined that the plurality of candidate intra prediction modes are used based on the MPM flag, the intra prediction unit 24 of the present embodiment may determine the plurality of candidate intra prediction modes, the number of which is fixed, for predicting the intra prediction mode of the current block while restoring the current intra prediction mode of the current block by using the parsed symbols of the blocks. For example, the intra prediction unit 24 may predict the current intra prediction mode by constantly using three candidate intra prediction modes. As another example, the intra prediction unit 24 may assume that two candidate intra prediction modes are constantly used.

The intra prediction unit 24 of the present embodiment may determine the plurality of candidate intra prediction modes based on intra prediction modes of a left block and an upper block that are adjacent to the current block.

The intra prediction unit 24 of the present embodiment may restore the intra prediction mode from the parsed symbols of the current block. The intra prediction unit 24 may perform the intra prediction on the current block by using the intra prediction mode.

The video decoding apparatus 20 may restore the residual data of the spatial domain from the quantized transformation coefficient of the residual data through the inverse quantization and the inverse transformation, in a case where the quantized transformation coefficient of the residual data of the current block is parsed from the bit stream. The intra prediction unit 24 may perform the intra prediction with respect to the residual data of the spatial domain of the current block by using the intra prediction mode.

The intra prediction mode 24 according to the present embodiment may determine a plurality of candidate intra prediction modes to predict the current intra prediction mode when the intra prediction modes of the left block and the upper block of the current block are the same as or different from each other. Therefore, the intra prediction mode 24 may determine the plurality of intra prediction modes without considering whether the intra prediction modes of the left block and the upper block are the same as each other.

If the intra prediction modes of the left block and the upper block are the same as each other, the intra prediction unit 24 of the present embodiment may determine default intra prediction modes as the plurality of candidate intra prediction modes based on the intra prediction mode of the left block. For example, when the intra prediction mode of the left block is a predetermined intra prediction mode, the plurality of candidate intra prediction modes may be determined to include a plurality of default intra prediction modes.

As another example, if the intra prediction modes of the left block and the upper block are the same as each other, the intra prediction mode 24 may determine a plurality of candidate intra prediction modes by using the intra prediction mode of the left block. For example, when the intra prediction mode of the left block is a predetermined intra prediction mode, the plurality of candidate intra prediction modes may be determined to include values borrowed or modified from the intra prediction mode of the left block.

If the intra prediction modes of the left block and the upper block are different from each other, the intra prediction mode 24 of the present embodiment may adopt the intra prediction modes of the left block and the upper block as two candidate intra prediction modes from among the plurality of candidate intra prediction modes.

The parsing unit 22 of the present embodiment may parse current intra mode information subsequent to the MPM flag when parsing the symbols of the current block from the bit stream.

The parsing unit 22 of the present embodiment may parse index information representing one candidate intra prediction mode from among the plurality of candidate intra prediction modes as the current intra mode information, if it is determined that the plurality of candidate intra prediction modes are used to determine the current intra prediction mode based on the parsed MPM flag. The intra prediction unit 24 may determine one candidate prediction mode selected based on the index information from among the plurality of candidate intra prediction modes as the current intra prediction mode.

The parsing unit 22 of the present embodiment may parse an index of the intra prediction mode exactly representing the intra prediction direction of the current block as the current intra mode information, in a case where the intra prediction mode of the current block is different from the intra prediction modes of the left block and the upper block based on the MPM flag. Therefore, the intra prediction unit 24 may determine the intra mode of the current block directly from the current intra mode information.

As another example, the intra prediction unit 24 may determine the intra prediction mode of the block based on the current intra mode information of the current block and the plurality of candidate intra prediction modes. For example, a relationship between the candidate intra prediction modes and the current intra prediction mode may be interpreted from the current intra mode information. In this case, the intra prediction unit 24 determines the plurality of candidate intra prediction modes even when the current intra prediction mode is different from the intra prediction modes of the left block and a right block, and may determine the current intra prediction mode by inferring from the candidate intra prediction modes by using the current intra mode information.

The scalable video decoding apparatus 20 of the present embodiment may include a central processor (not shown) that controls the parsing unit 22 and the intra prediction unit 24. Alternatively, the parsing unit 22 and the intra prediction unit 24 are respectively driven by exclusive processors (not shown), and the video decoding apparatus 20 may be driven overall by systematical operations of the processors (not shown). Alternatively, the parsing unit 22 and the intra prediction unit 24 may be controlled by an external processor (not shown) of the video decoding apparatus 20 according to the present embodiment.

According to the present embodiment, the video decoding apparatus 20 may include one or more data storage units (not shown) for storing input/output data of the parsing unit 22 and the intra prediction unit 24. The video decoding apparatus 20 may include a memory controller (not shown) for controlling data input/output of the data storage unit (not shown).

According to the present embodiment, the video decoding apparatus 20 may perform the video decoding operation including the inverse transformation by operating in connection with a video decoding processor mounted therein or an external video decoding processor to restore the video through the video decoding. The internal video decoding processor in the video decoding apparatus 20 according to an exemplary embodiment may include a video decoding processing module included in the video decoding apparatus 20, or a central calculation device or a graphic calculation device to perform a basic video decoding operation, as well as a separate processor.

According to the video encoding apparatus 10 and the video decoding apparatus 20 described with reference to FIGS. 1 and 2, while restoring the intra prediction mode by parsing the symbols of the blocks from the bit stream, the symbols of the blocks including the MPM flag and the current intra mode information are parsed, and then, the current intra prediction mode may be restored based on the MPM flag and the current intra mode information among the parsed symbols. Therefore, a process of parsing the symbols of the blocks from the bit stream and a process of restoring the intra prediction mode from the parsed symbols may be separate from each other. When the parsing and restoring processes of the symbols are not separate, the symbols need to be restored while parsing the symbols and the symbols are parsed again, that is, the parsing and restoring operations of the block symbols are repeated, thereby degrading efficiency of the decoding process. Therefore, according to the video encoding apparatus 10 and the video decoding apparatus 20 of the present embodiment, the parsing and restoring processes of the intra prediction mode are separate during the parsing of the symbols, and accordingly, efficiency of the decoding process may be improved.

If the number of candidate intra prediction modes varies depending on cases even when there are a plurality of candidate intra prediction modes, the parsing process becomes complicated because variables according to the number of the candidate intra prediction modes need to be considered when parsing the intra related information. However, according to the video decoding apparatus 20 of the present embodiment, a constant number of candidate intra prediction modes are assumed when predicting the intra prediction mode by using the candidate intra prediction modes, and thus, the MPM flag and the current intra mode information may be parsed without considering a case where the number of candidate intra prediction modes is changed during the symbol parsing process, thereby reducing the complexity of the parsing operation.

Hereinafter, exemplary embodiments for predicting the intra prediction modes that may be realized in the video encoding apparatus 10 and the video decoding apparatus 20 will be described.

Figure 3:
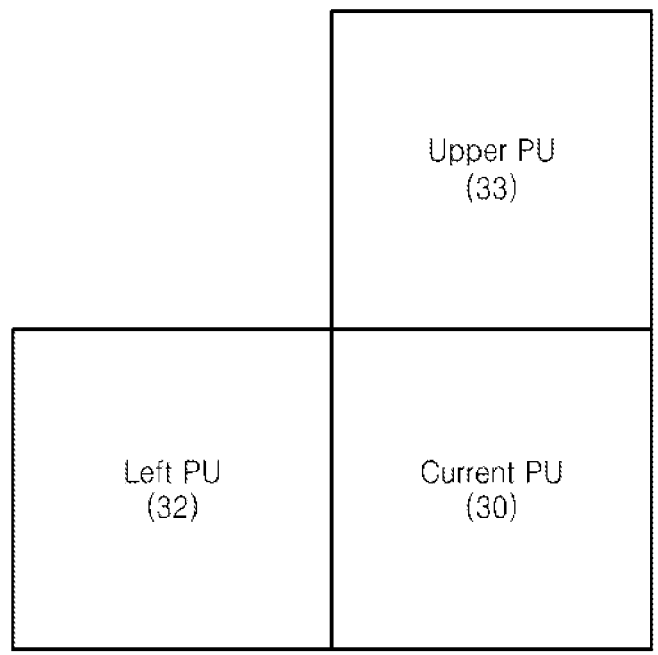
FIG. 3 is a diagram showing neighboring prediction units referred to for predicting an intra prediction mode according to an exemplary embodiment.

FIG. 3 is a diagram showing blocks referred to for predicting the intra prediction modes according to an exemplary embodiment.

Prediction units (PUs) are shown as examples of the blocks. The PUs are data units for performing the prediction by each coding unit, in a video encoding method based on a coding unit according to a tree structure. The video encoding apparatus 10 and the video decoding apparatus 20 according to the present embodiment are not limited to the PU having a fixed size, but may perform the prediction with respect to PUs of various sizes. The video decoding method and the PU based on the coding unit according to the tree structure will be described later with reference to FIGS. 7 through 19. Hereinafter, exemplary embodiments for predicting the intra prediction mode of the PU will be described; however, the exemplary embodiments may be applied similarly to various kinds of blocks.

The video encoding apparatus 10 according to the present embodiment may determine whether there is an intra prediction mode that is the same as the current prediction mode of a current PU 30, from among the intra prediction modes of a left PU 32 and an upper PU 33, to predict the intra prediction mode of the current PU 30 according to the present embodiment. The MPM flag may be encoded according to the determination result.

For example, if the intra prediction modes of the left PU 32 and the upper PU 33 are different from the current intra prediction mode, the MPM flag is encoded to '0', and if at least one of the intra prediction modes of the left PU 32 and the upper PU 33 is the same as the current intra prediction mode, the MPM flag may be encoded to '1'.

Hereinafter, the intra prediction modes of the left and upper PUs 32 and 33 will be referred to as left and upper intra prediction modes, respectively, for convenience of description.

If the left and upper intra prediction modes are different from the current intra prediction mode, the current intra mode information representing the current intra prediction mode may be encoded.

If there is the intra prediction mode that is the same as the current intra prediction mode between the left and upper intra prediction modes, two or more different candidate intra prediction modes may be determined for predicting the current intra prediction mode. The candidate intra prediction modes may be intra prediction modes that have a higher probability to be predicted as the current intra prediction mode.

The two candidate intra prediction modes may be the left intra prediction mode and the upper intra prediction mode.

MPM0=min(leftIntraMode,aboveInftraMode);

MPM1=max(leftIntraMode, aboveInftraMode);   <MPM determination equation 1>

In the MPM determination equation 1, MPM0 and MPM1 are respectively first rank and second rank candidate intra prediction modes. min(A, B) is a function for outputting a smaller value between values of A and B, and max(A, B) is a function for outputting a greater value between values of A and B.

In the MPM determination equation 1, leftIntraMode and aboveInftraMode are respectively an index of the left intra prediction mode and an index of the upper intra prediction mode. A smaller index is allocated to the intra prediction mode of higher probability of being generated or preferably adopted.

That is, according to the MPM determination equation 1, the index of the left intra prediction mode and the upper intra prediction mode are mapped with the first and second rank candidate intra prediction modes in an increasing order, and thus, the left intra prediction mode and the upper intra prediction mode may be adopted as the candidate intra prediction mode in an order of higher probability or priority.

The above case is also applied to the video decoding apparatus 20. The left and upper intra prediction modes are different from the current intra prediction mode after parsing the MPM flag from the bit stream, the current intra mode information representing the present intra prediction mode is parsed from the bit stream, and when there is the intra prediction mode between the left and upper intra prediction modes that is the same as the current intra prediction mode, two or more different candidate intra prediction modes for predicting the current intra prediction mode may be determined.

However, when the left intra prediction mode and the upper intra prediction mode are the same as each other, the plurality of candidate intra prediction modes need to be further determined even if the left and upper intra prediction modes are adopted as the candidate intra prediction modes.

Hereinafter, assuming that there is the intra prediction mode between the left and upper intra prediction modes, which is the same as the current intra prediction mode, and the left and upper intra prediction modes are the same as each other, exemplary embodiments for determining the plurality of different candidate intra prediction modes will be described.

EXAMPLE 1

The plurality of candidate intra prediction modes may include different default intra prediction modes. As a default intra prediction mode according to the present embodiment, an intra prediction mode that has a higher probability of being generated, an intra prediction mode having an improved prediction function, or a mode similar to the left intra prediction mode may be adopted. The prediction mode having the higher probability of being generated or having the improved prediction function may include a DC prediction mode, a planar mode, and a vertical direction prediction mode (hereinafter, a vertical mode).

In a case where the intra prediction is performed according to the planar mode from among the intra prediction modes, brightness of pixels in the PU has a gradation shape and may be predicted to be gradually brightened or darkened in a predetermined direction.

For example, in a case where the left intra prediction mode is the DC prediction mode or the planar mode, three candidate intra prediction modes are default intra prediction modes, that is, the DC prediction mode, the planar mode, and the vertical mode.

EXAMPLE 2

The plurality of candidate intra prediction modes may include the left intra prediction mode and the default intra prediction modes.

if(leftIntraMode==aboveIntraMode==DC)

aboveIntramode=Planar mode{or 0 if no planar
        mode} else aboveIntraMode=DC          <MPM determination equation 2>

According to the MPM determination equation 2, after determining the left intra prediction mode and the upper intra prediction mode, the candidate intra prediction modes may be determined by the MPM determination equation 1.

According to the MPM determination equation 2, if the left and upper intra prediction modes are both DC intra prediction modes, the upper intra prediction mode may be changed into the planar mode (or an intra prediction mode having an index "0"). In this case, the candidate intra prediction modes may include the DC prediction mode that is the left intra prediction mode or the planar mode (or the intra prediction mode of the index "0") according to the MPM determination equation 1.

Also, according to the MPM determination equation 2, in a case where at least one of the left intra prediction mode and the upper intra prediction mode is not the DC intra prediction mode, the upper intra prediction mode may be changed into the DC intra prediction mode. In this case, the candidate intra prediction modes may include the left intra prediction mode or the DC intra prediction mode according to the MPM determination equation 1.

EXAMPLE 3

A plurality of candidate intra prediction modes may be changed into values using the left intra prediction mode or modified from the left intra prediction mode.

For example, in a case where the left intra prediction mode is an intra prediction mode of a predetermined direction, the candidate intra prediction modes include the left intra prediction mode and may include the intra prediction mode corresponding to an index increasing or decreasing from the index representing the left intra prediction mode by a predetermined offset.

MPM0=leftIntraMode;

MPM1=leftIntraMode-n;

MPM2=leftIntraMode+n;      <MPM determination equation 3>

According to the MPM determination equation 3, the left intra prediction mode may be adopted as the first rank candidate intra prediction mode, an intra prediction mode having an index that is less than that of the left intra prediction mode by n may be adopted as the second rank candidate intra prediction mode, and an intra prediction mode having an index that is greater than that of the left intra prediction mode by n may be adopted as the third rank candidate intra prediction mode. Here, n may be, for example, an integer equal to or greater than 1.

EXAMPLE 4

A plurality of candidate intra prediction modes may be determined by using a lookup table showing correlations between a value of the left intra prediction mode and corresponding candidate intra prediction modes. That is, a plurality of candidate intra prediction modes mapped with the left intra prediction mode may be selected based on the lookup table. Since the candidate intra prediction modes are determined according to the left intra prediction mode in the above described examples 1, 2, and 3, similar results to those of the lookup table mapping method according to the left intra prediction mode may be derived.

EXAMPLE 5

The lookup table of the candidate intra prediction modes may include the left intra prediction mode as the first rank, and may include the intra prediction modes having higher generation frequencies as the second rank and the like.

The generation frequency or statistical probability of each intra prediction mode that is encoded (decoded) earlier is determined, and the intra prediction modes having higher statistical probabilities may be adopted as the candidate intra prediction modes.

EXAMPLE 7

If an intra prediction mode of the intra prediction modes of the left and upper PUs is different from those of the neighboring PUs, the candidate intra prediction modes may include the left (or upper) intra prediction mode and the detected intra prediction mode of the neighboring PU.

The above examples will now be further described with reference to FIG. 4.

Figure 4:
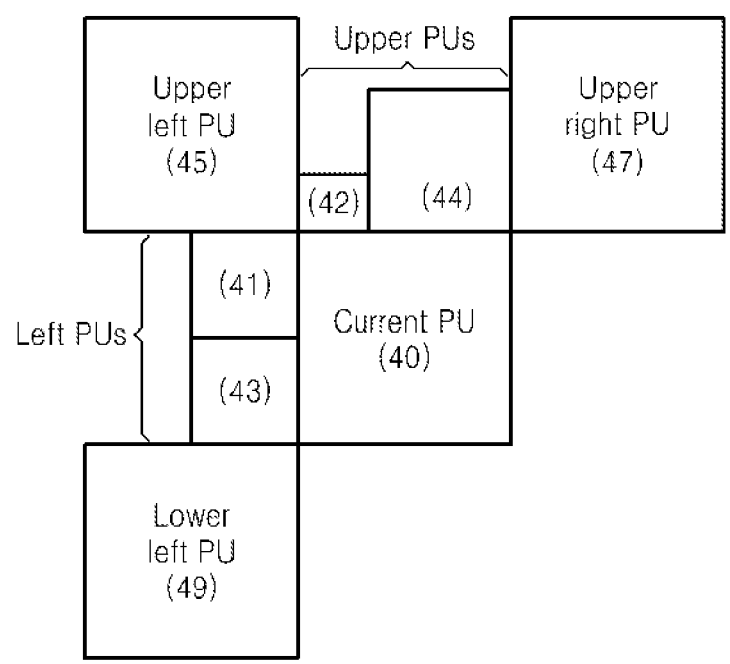
FIG. 4 is a diagram showing prediction units referred to for predicting an intra prediction mode in video coding based on a decoding unit according to a tree structure according to an exemplary embodiment.

FIG. 4 shows examples of PUs that are referred to for predicting the intra prediction mode in the video encoding based on a coding unit according to a tree structure.

To predict the intra prediction mode of a current PU 40, a left PU 41 and an upper PU 42 may be referred to with top priority. If there are a plurality of PUs adjacent to a left or an upper boundary of the current PU 40, the intra prediction modes of the left and upper PUs 41 and 42 that are adjacent to an upper left sample in the current PU 40 may be referred to with priority.

If the intra prediction modes of the left PU 41 and the upper PU 42 are the same as each other, intra prediction modes of neighboring PUs of predetermined locations except for the left and upper PUs 41 and 42 from among the neighboring PUs adjacent to the current PU 40 may be referred to. For example, the intra prediction modes of an upper left PU 45, an upper right PU 47, and a lower left PU 49 may be referred to. If one of the intra prediction modes of the upper left PU 45, the upper right PU 47, and the lower left PU 49 is different from the intra prediction modes of the left and upper PUs 41 and 42, it may be adopted as the candidate intra prediction mode.

For example, the first rank candidate intra prediction mode may be the intra prediction modes of the left PU 41 and the upper PU 42. It is detected whether there is an intra prediction mode that is the different from the intra prediction modes of the left and upper PUs 41 and 42, from among the intra prediction modes of the upper left PU 45, the upper right PU 47, and the lower left PU 49 in a predetermined order, and the intra prediction mode that is first detected may be adopted as the second rank candidate intra prediction mode.

As another example, if the intra prediction modes of the left and upper PUs 41 and 42 are the same as each other, it is sequentially detected in a predetermined order whether there is an intra prediction mode that is different from the intra prediction modes of the left and upper PUs 41 and 42 from among the intra prediction modes of the neighboring PUs 43, 44, 45, 47, and 49 except for the left and upper PUs 41 and 42, and the intra prediction mode that is first detected may be adopted as the second rank candidate prediction mode.

In more detail, the intra prediction mode of the neighboring PUs is compared with the intra prediction modes of the left and upper PUs 41 and 42 starting from the upper right PU 47, and it may be determined by searching whether there is a PU having the intra prediction mode that is different from the intra prediction modes of the left and upper PUs 41 and 42 among the neighboring PUs 47, 44, and 45 located on an upper portion of the current PU 40. The intra prediction mode that is first detected may be adopted as the second rank candidate intra prediction mode.

After searching for the upper left PU 45, if there is no intra prediction mode that is different from the intra prediction modes of the left and upper PUs 41 and 42, it may be determined by searching whether there is a PU having the intra prediction mode that is different from the intra prediction modes of the left and upper PUs 41 and 42 starting from the lower left PU 49 upward among the neighboring PUs located at a left side of the current PU 40. The intra prediction mode first detected may be adopted as the second rank candidate intra prediction mode.

In the present embodiment, the neighboring PUs located on an upper portion of the current PU starting from the upper right PU 47 are searched for, and then, the neighboring PUs located at the left side of the current PU starting from the lower left PU 49 are searched for; however, the above searching order may vary.

In a case where one of the left and upper intra prediction modes is the same as the current intra prediction mode and the left intra prediction mode and the upper intra prediction mode are the same as each other, various exemplary embodiments for determining the plurality of different candidate intra prediction modes are described above.

As described above, the video encoding apparatus 10 and the video decoding apparatus 20 of the present embodiment may predict the current intra prediction mode by using the plurality of candidate intra prediction modes that are different from each other in a case where there is at least one of the left and upper intra prediction mode, which is the same as the current prediction mode, and the left and upper intra prediction modes are different from or the same as each other.

Accordingly, if the intra prediction modes of the neighboring left and upper blocks are the same as each other, the video encoding apparatus 10 does not need to encode the information representing a case where the number of candidate intra prediction modes is changed, and may encode only the MPM flag and the current intra mode information as the information relating to the intra prediction mode.

Therefore, the video decoding apparatus 20 according to the present embodiment parses only the MPM flag and the current intra mode information during the parsing process of the information relating to the intra prediction of the current block, and there is no need to determine whether the intra prediction modes of the neighboring left and upper blocks are the same as each other. Since there is no need to determine whether the intra prediction modes of the left and upper blocks are the same as each other, there is no need to restore the intra prediction modes of the left and upper blocks. In addition, since the process of restoring the intra prediction mode from the parsed symbols during the parsing of the symbols and parsing the symbols again is omitted, the parsing process of the intra prediction mode may be performed more promptly. As such, efficiency of the decoding process including the parsing and restoring of the intra prediction mode may be improved.

Also, the prediction mode of the intra prediction mode for processing only one candidate intra prediction mode is omitted, and thus, the decoding process may be simplified.

Figure 5:
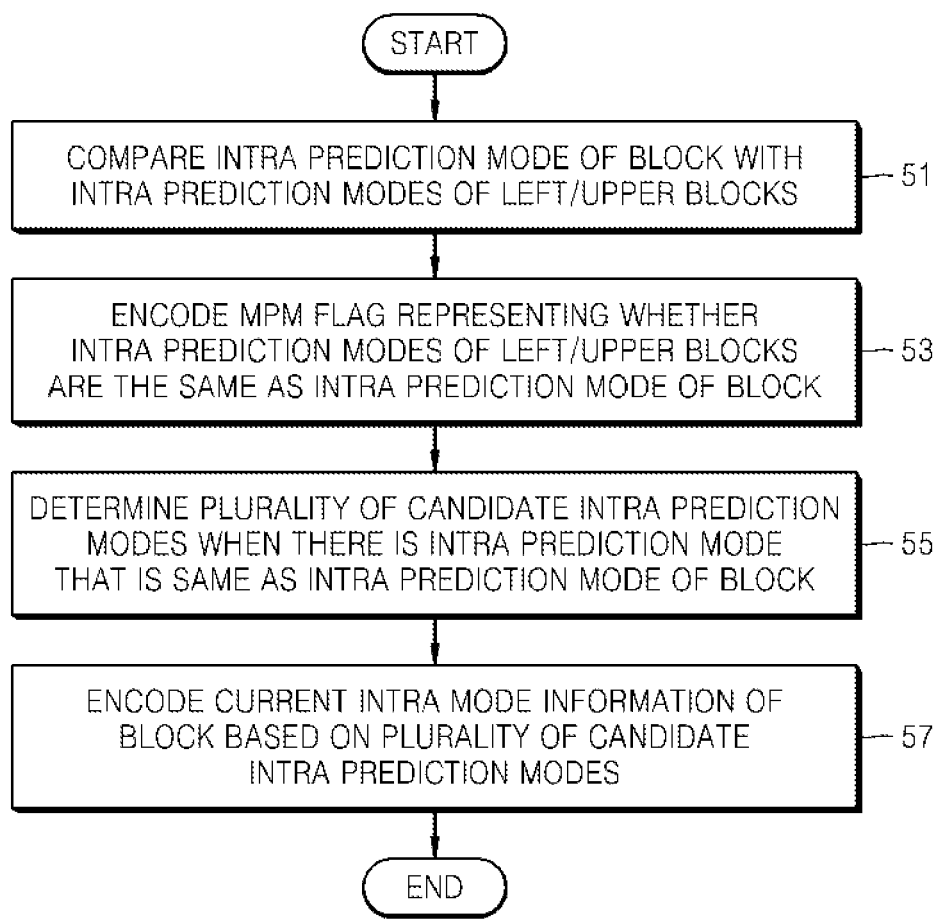
FIG. 5 is a flowchart illustrating a video encoding method according to an exemplary embodiment.

FIG. 5 is a flowchart illustrating a video encoding method according to an exemplary embodiment.

In operation S51, the intra prediction mode determined through the intra prediction of the current block from among the video blocks is compared with intra prediction modes of the left block and the upper block that are adjacent to the current block.

In operation S53, an MPM flag representing whether there is the intra prediction mode between the intra prediction modes of the left and upper blocks of the current block, which is the same as the intra prediction mode of the current block is encoded.

In operation S55, if there is the intra prediction mode that is the same as the intra prediction mode of the current block between the intra prediction modes of the left and upper blocks, a plurality of candidate intra prediction modes, the number of which is fixed, are determined even if the intra prediction modes of the left and upper locks are different from or the same as each other.

In operation S57, the current intra mode information of the current block, which is determined based on the plurality of candidate intra prediction modes, is encoded.

If the intra prediction modes of the left and upper blocks are the same as each other in operation S55, the default intra prediction modes may be determined as the plurality of candidate intra prediction modes based on the intra prediction mode of the left block.

Also, in a case where the intra prediction modes of the left and upper blocks are the same as each other, the plurality of candidate intra prediction modes may be determined by using the intra prediction mode of the left block.

Also, if the intra prediction modes of the left and upper blocks are different from each other, two candidate intra prediction modes from among the plurality of candidate intra prediction modes may be determined as the intra prediction modes of the left and upper blocks.

In operation 57, if there is the intra prediction mode that is the same as the intra prediction mode of the current block between the intra prediction modes of the left and upper blocks, index information representing the candidate intra prediction mode corresponding to the intra prediction block of the current block from among the plurality of candidate intra prediction modes may be encoded.

Also, the current intra prediction mode of the current block is determined based on the intra prediction mode of the current block and the plurality of candidate intra prediction modes even when the intra prediction mode of the current block is different from the intra prediction modes of the left and upper blocks in operation S55, and accordingly, the current intra mode information representing a relationship between the current intra prediction mode and the candidate intra prediction modes may be encoded in operation S57.

Figure 6:
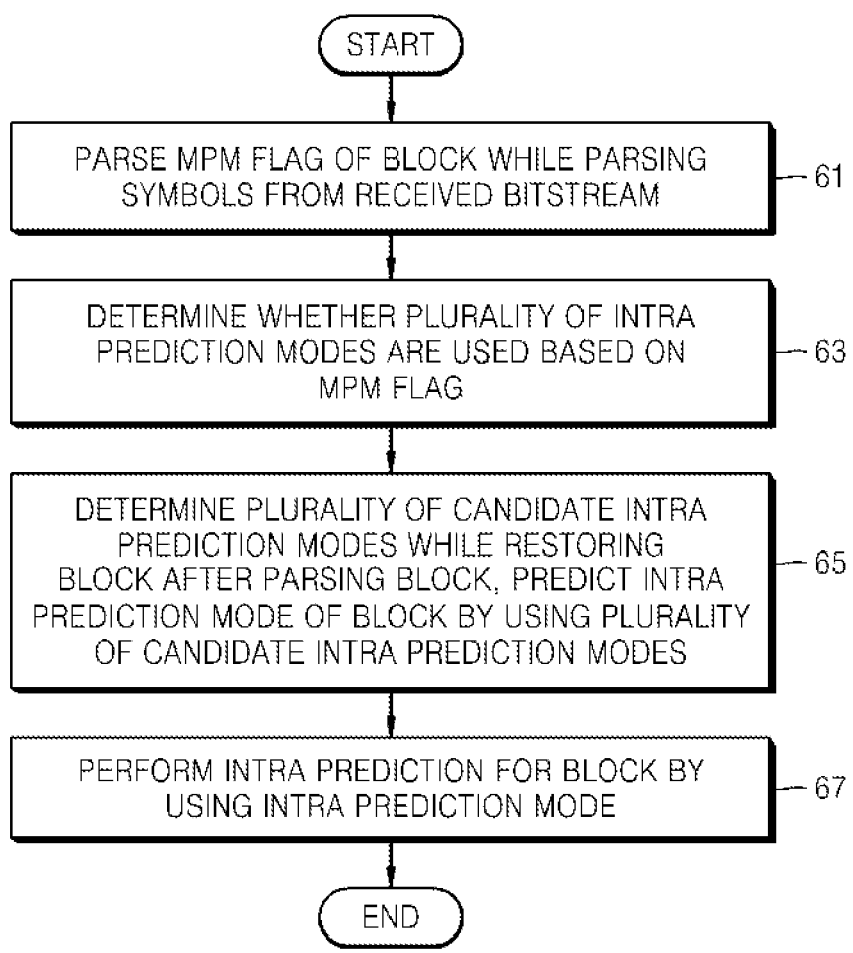
FIG. 6 is a flowchart illustrating a video decoding method according to an exemplary embodiment.

FIG. 6 is a flowchart illustrating a video decoding method according to an exemplary embodiment.

In operation S61, the MPM flag of the current block is parsed while parsing the symbols of the current block from among the encoded blocks from the received bit stream.

In operation S63, it is determined whether the plurality of candidate intra prediction modes, the number of which is fixed, are used, to predict the intra prediction mode of the current block based on the MPM flag.

In operation S65, after parsing the block symbols, the intra prediction mode of the current block is restored by using the parsed symbols. In a case where it is determined that the plurality of candidate intra prediction modes are used based on the MPM flag in operation S63, the plurality of candidate intra prediction modes, the number of which is fixed, may be determined to predict the intra prediction mode of the current block based on the intra prediction modes of the left and upper blocks that are adjacent to the current block in operation S65. The intra prediction mode of the current block may be predicted by using the determined plurality of candidate intra prediction modes.

In operation S67, the intra prediction on the current block is performed by using the intra prediction mode predicted in operation S65.

When the plurality of candidate intra prediction modes are determined in operation S65, if the intra prediction modes of the left and upper blocks are the same as each other, the default intra prediction modes may be determined as the plurality of candidate intra prediction modes based on the intra prediction mode of the left block.

Also, if the intra prediction modes of the left and upper blocks are the same as each other, the plurality of candidate intra prediction modes may be determined by using the intra prediction mode of the left block.

When the plurality of candidate intra prediction modes are determined in operation S65, if the intra prediction modes of the left and upper blocks are different from each other, two candidate intra prediction modes from among the plurality of candidate intra prediction modes may be determined as the intra prediction modes of the left and upper blocks.

If it is determined that the plurality of intra prediction modes are used to predict the intra prediction mode of the current block based on the MPM flag in operation S63, index information representing one of the plurality of candidate intra prediction modes may be parsed from the bit stream. In this case, in operation S65, one candidate intra prediction mode selected based on the index information from among the plurality of candidate intra prediction modes may be determined as the intra prediction mode of the current block.

Also, in a case where it is determined that the intra prediction mode of the current block is different from the intra prediction modes of the left and upper blocks based on the MPM flag in operation S63, the current intra mode information of the current block may be further parsed from the bit stream. In this case, in operation S64, a relationship between the intra prediction mode of the current block and the plurality of candidate intra prediction modes is interpreted from the parsed current intra mode information of the current block, and the intra prediction mode of the block may be determined based on the interpreted result.

In the video encoding apparatus 10 and the video decoding apparatus 20 according to an exemplary embodiment, the blocks divided from the video data are divided into the coding units of the tree structure, and the PUs are used for performing the intra prediction with respect to the coding units, as described above. Hereinafter, a method and an apparatus for encoding a video, and a method and an apparatus for decoding a video based on a coding unit of a tree structure and a transformation unit will be described with reference to FIGS. 7 through 19.

Figure 7:
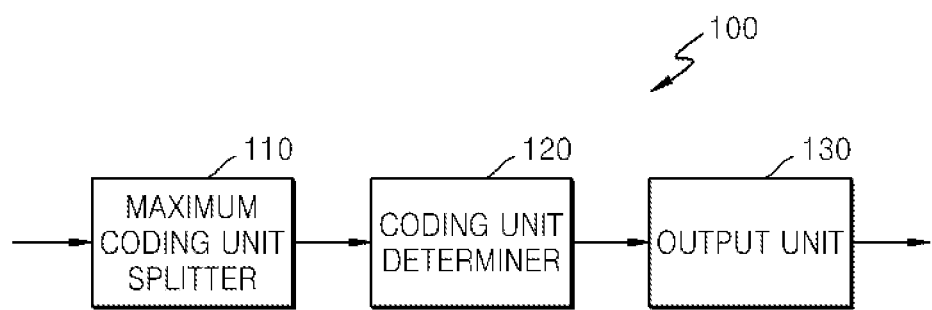
FIG. 7 is a block diagram of a video encoding apparatus based on coding units of a tree structure according to an exemplary embodiment.

FIG. 7 is a block diagram of a video encoding apparatus 100 based on a coding unit according to a tree structure according to an exemplary embodiment.

The video encoding apparatus 100 for performing video prediction based on a coding unit of the tree structure according to the present embodiment includes a maximum coding unit splitter 110, a coding unit determiner 120, and an output unit 130. Hereinafter, the term 'video encoding apparatus 100' is used to refer to an apparatus for performing video prediction based on a coding unit of the tree structure according to the present embodiment, for convenience of description.

The maximum coding unit splitter 110 may split a current picture of an image based on a maximum coding unit. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and a length in squares of 2. The image data may be output to the coding unit determiner 120 according to the at least one maximum coding unit.

A coding unit according to an exemplary embodiment may be characterized by a maximum size and a depth. The depth denotes the number of times the coding unit is spatially split from the maximum coding unit, and as the depth increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit may be hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the image data for each maximum coding unit are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth of one maximum coding unit, it is determined whether to split each of the coding units corresponding to the same depth to a lower depth by measuring an encoding error of the image data of the each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting from a maximum coding unit to a minimum coding unit. A first maximum depth according to an exemplary embodiment may denote the total number of splitting from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding including the prediction encoding and the transformation is performed on all of the deeper coding units generated as the depth increases. For convenience of description, the prediction encoding and the transformation will now be described based on a coding unit of a current depth, in a maximum coding unit.

The video encoding apparatus 100 may variously select a size or a shape of a data unit for encoding the image data. To encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

To perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition may be a data unit obtained by splitting the prediction unit of the coding unit, and the prediction unit may be a partition having the same size as that of the coding unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. To perform the transformation in the coding unit, the transformation may be performed based on a data unit having a size smaller than or equal to the coding unit. For example, the data unit for the transformation may include a data unit for an intra mode and a data unit for an inter mode.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

A transformation depth indicating the number of splitting to reach the transformation unit by splitting the height and the width of the coding unit may also be set in the transformation unit. For example, in a current coding unit of 2N×2N, a transformation depth may be 0 when the size of a transformation unit is also 2N×2N, may be 1 when the size of the transformation unit is thus N×N, and may be 2 when the size of the transformation unit is thus N/2×N/2. That is, the transformation unit may be set according to a tree structure.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a prediction unit/partition, and the transformation unit, according to exemplary embodiments will be described in detail later with reference to FIGS. 7 through 19.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Also, the minimum unit may be a maximum square data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or groups of pictures (GOPs), and information about a maximum depth may be inserted into a header of a bitstream, a sequence parameter set (SPS), or a picture parameter set (PPS).

Also, information about a maximum size and a minimum size of the transformation unit allowed to the current video may be output via a header of a bitstream, SPS, or PPS. The output unit 130 may encode and output reference information relating to the prediction described with reference to FIGS. 1 through 6, e.g., the prediction information, single direction prediction information, and slice type information including a fourth slice type.

In the video encoding apparatus 100, the deeper coding unit may be a coding unit obtained by dividing a height or a width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include at most 4 coding units of the lower depth.

Accordingly, the video encoding apparatus 100 may form the coding units having the tree structure by determining coding units having an appropriate (e.g., optimum) shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined in consideration of characteristics of the coding unit of various image sizes.

Thus, if an image having a higher resolution or larger data amount is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit in consideration of a size of the image.

The video encoding apparatus 100 of FIG. 7 may perform operations of the video encoding apparatus 10 described with reference to FIG. 1.

The coding unit determiner 120 may perform operations of the intra prediction unit 12 of the video encoding apparatus 10. The prediction unit for the intra prediction is determined at every maximum coding unit according to the coding units having the tree structure, and the intra prediction may be performed by every prediction unit.

The output unit 130 may perform operations of the symbol encoding unit 14 of the video encoding apparatus 10. The MPM flag may be encoded for predicting the intra prediction mode at every PU. If the intra prediction mode of the current PU is the same as at least one of the intra prediction modes of the left and upper PUs, the plurality of candidate intra prediction modes, the number of which is fixed, are determined without regard to whether the left intra prediction mode and the upper intra prediction mode are the same as or different from each other, and the current intra mode information for the current PU is determined and encoded based on the candidate intra prediction modes.

The output unit 130 may determine the number of candidate prediction modes for every picture. Similarly, the number of candidate intra prediction modes may be determined for every slice, for every maximum coding unit, for every coding unit, or for every PU. Exemplary embodiments are not limited thereto, and in an exemplary embodiment, the number of candidate intra prediction modes may be determined again for every predetermined data unit.

The output unit 130 may encode the information representing the number of the candidate intra prediction modes as a parameter of various data unit levels such as the PPS, the SPS, the maximum coding unit level, the coding unit level, and the PU level, according to a level of the data unit to update the number of the candidate intra prediction modes. However, even if the number of the candidate intra prediction modes is determined for every data unit, the information representing the number of the candidate intra prediction modes may not be always encoded.

Figure 8:
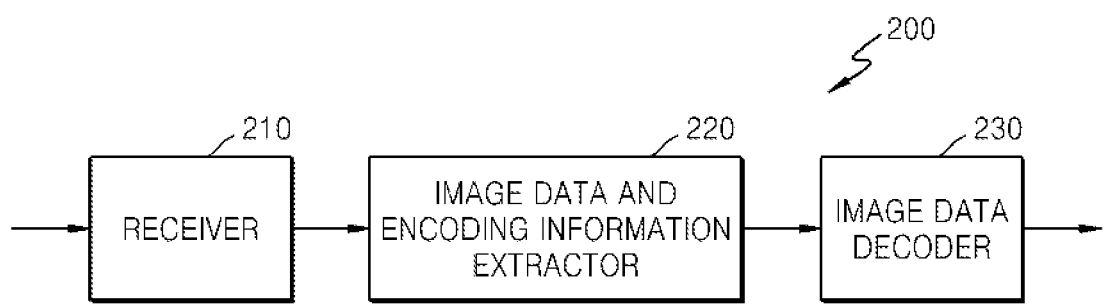
FIG. 8 is a block diagram of a video decoding apparatus based on coding units of a tree structure according to an exemplary embodiment.

FIG. 8 is a block diagram of a video decoding apparatus 200 based on a coding unit according to a tree structure, according to an exemplary embodiment.

The video decoding apparatus 200 performing video prediction based on a coding unit of the tree structure according to the present embodiment includes a receiver 210, an image data and encoding information extractor 220, and an image data decoder 230. Hereinafter, the term video decoding apparatus 200' is used to refer to an apparatus for performing video prediction based on a coding unit of the tree structure according to the present embodiment.

Definitions of various terms, such as a coding unit, a depth, a prediction unit, a transformation unit, and information about various encoding modes, for various operations of the video decoding apparatus 200 are substantially the same as those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, the SPS, or the PPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit according to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, to perform the inverse transformation according to maximum coding units. Through the inverse transformation, pixel values of the coding unit in the spatial domain may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. The decoding of the current coding unit may be performed by collecting the information about the coding mode for every coding unit determined as above.

Also, the video decoding apparatus 200 of FIG. 8 may perform operations of the video decoding apparatus 20 described with reference to FIG. 2.

The receiver 210 may perform operations of the parsing unit 22 of the video decoding apparatus 20. The image data and encoding information extractor 220 and the image data decoder 230 may perform operations of the intra prediction unit 24 of the video decoding apparatus 20.

The parsing unit 22 may parse the MPM flag for predicting the intra prediction mode from the bitstream for every PU, when the PU for the intra prediction is determined by the coding unit having the tree structure. The current intra mode information may be parsed from the bitstream subsequent to the MPM flag without determining whether the left intra prediction mode and the upper intra prediction mode are the same as or different from each other. The image data and encoding information extractor 220 may restore the current intra prediction mode from the parsed information after finishing the parsing of the block symbols including the MPM flag and the intra mode information. The current intra prediction mode may be predicted by using the plurality of candidate intra prediction modes, the number of which is fixed. The image data decoder 230 may perform the intra prediction of the current PU by using the restored intra prediction mode and the residual data.

The image data and encoding information extractor 220 may determine the number of the candidate intra prediction modes for every picture.

The parsing unit 22 may parse the information representing the number of the candidate intra prediction modes, the number of which is fixed, from the parameters of various data unit levels such as the PPS of the bitstream, the SPS, the maximum coding unit level, the coding unit level, and the PU level. In this case, the image data and encoding information extractor 220 may determine the candidate intra prediction modes by as many as the number represented by the parsed information for every data unit corresponding to the level from which the information is parsed.

However, the image data and encoding information extractor 220 may update the number of candidate intra prediction modes for every slice, the maximum coding unit, the coding unit, or the PU even when the information representing the number of candidate intra prediction modes is not parsed.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded.

Accordingly, even if image data has higher resolution and a larger amount of data, the image data may be efficiently decoded and restored by using a size of a coding unit and an encoding mode, which are adaptively determined according to characteristics of the image data, by using information about an optimum encoding mode received from an encoder.

Figure 9:
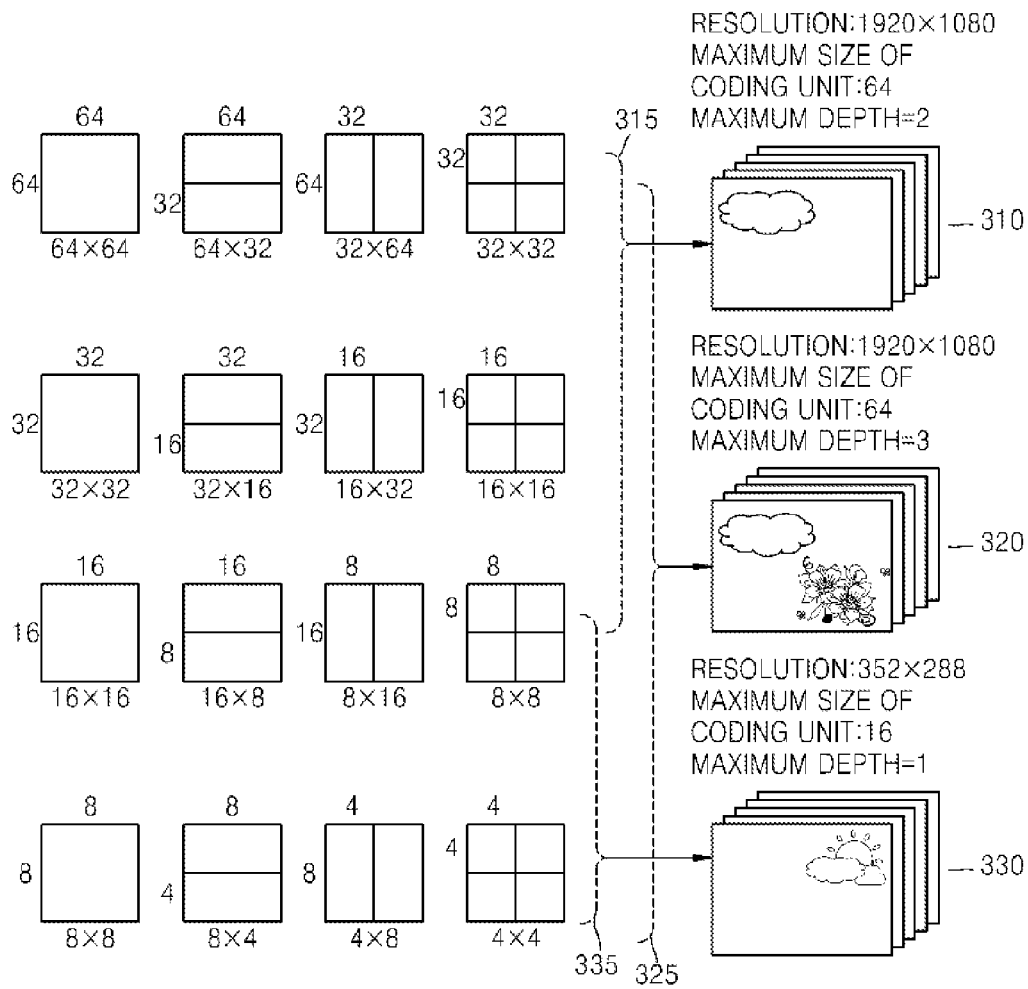
FIG. 9 is a diagram for describing a concept of coding units according to an exemplary embodiment.

FIG. 9 is a diagram for describing a concept of coding units according to an exemplary embodiment.

A size of a coding unit may be expressed in width×height, and may be, for example, 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 9 denotes a total number of splits from a maximum coding unit to a minimum decoding unit.

If a resolution is higher or a data amount is larger, a maximum size of a coding unit may be larger to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased by two layers by splitting the maximum coding unit twice. Since the maximum depth of the video data 330 is 1, coding units 335 of the video data 330 may include a maximum coding unit having a long axis size of 16, and coding units having a long axis size of 8 since depths are increased by one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased by 3 layers by splitting the maximum coding unit three times. As a depth increases, detailed information may be expressed more precisely.

Figure 10:
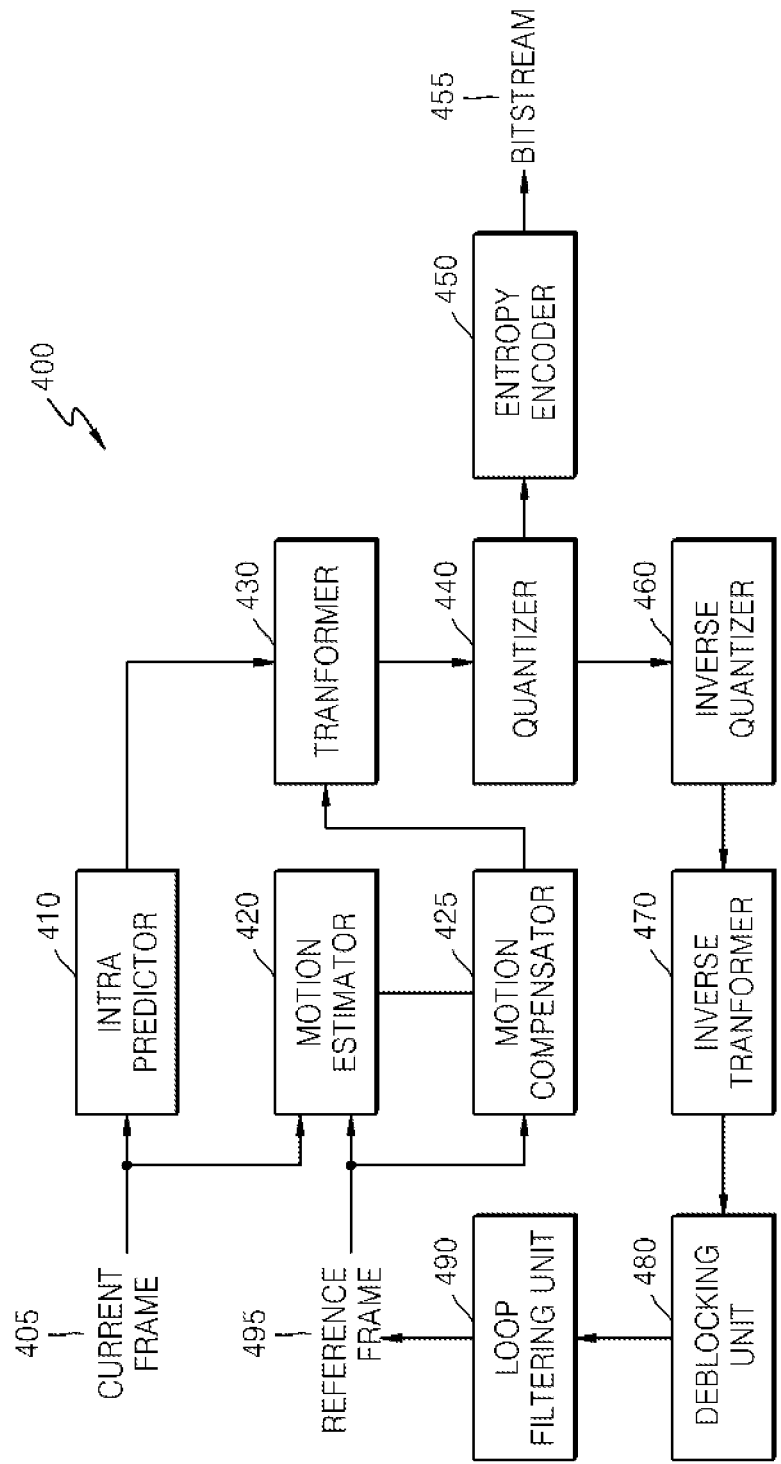
FIG. 10 is a block diagram of an image encoder based on coding units according to an exemplary embodiment.

FIG. 10 is a block diagram of an image encoder 400 based on coding units according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

In particular, the intra predictor 410 may perform operations of the intra prediction unit 12 of the video decoding apparatus 10. A PU for the intra prediction is determined by the coding unit having the tree structure for every maximum coding unit, and the intra prediction may be performed for the PU.

In a case where the current PU and the left/upper PUs are the same as each other and the left intra prediction mode and the upper intra prediction mode are the same as or different from each other, the plurality of candidate intra prediction modes are determined, and thus, the entropy encoder 450 encodes the MPM flag for every PU, and then, may encode the current intra mode information based on the candidate intra prediction modes for the current prediction unit.

Figure 11:
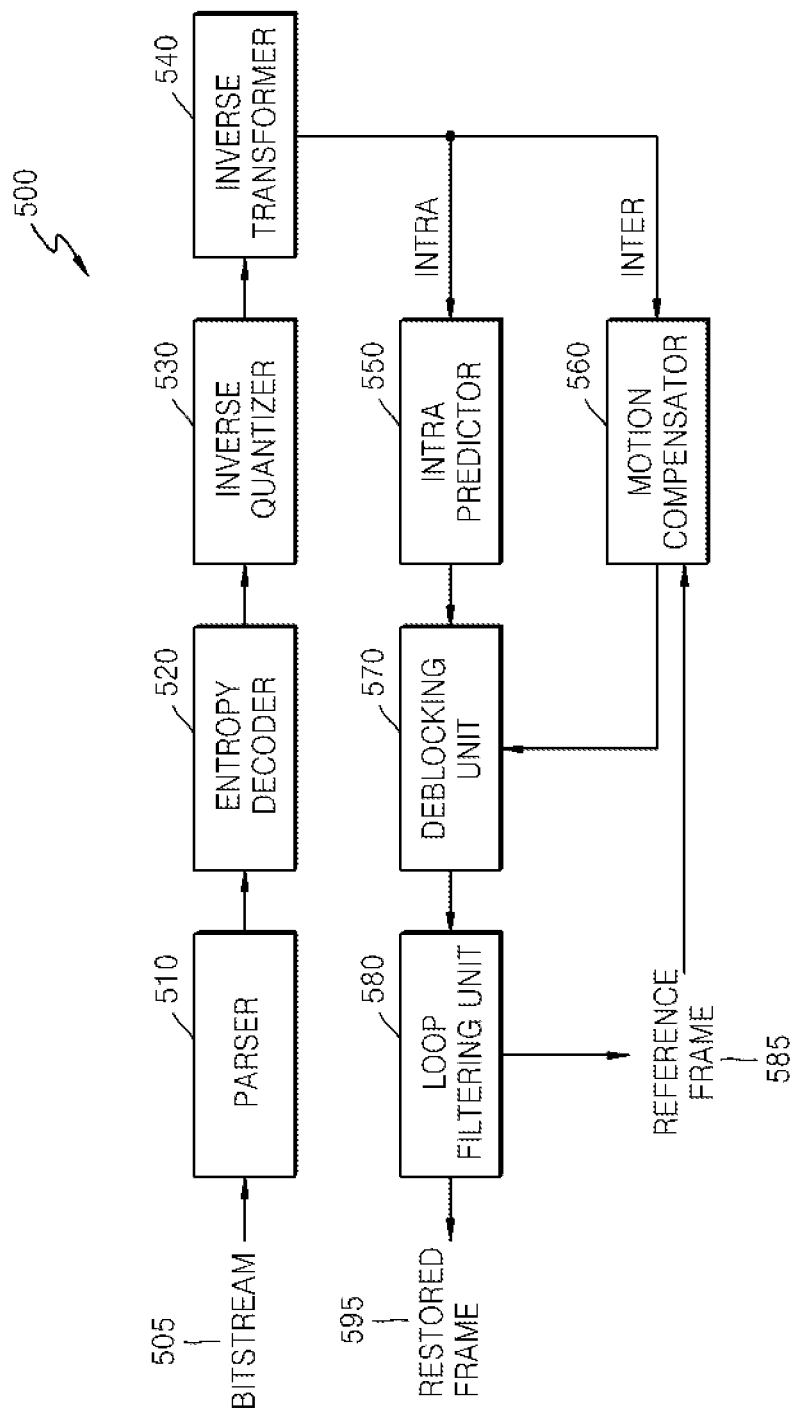
FIG. 11 is a block diagram of an image decoder based on coding units according to an exemplary embodiment.

FIG. 11 is a block diagram of an image decoder 500 based on coding units according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which is passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

To decode the image data in the image data decoder 230 of the video decoding apparatus 200, the image decoder 500 may perform operations on parsed symbols after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 perform operations based on a size of a transformation unit for each coding unit.

In particular, the parser 510 may parse the MPM flag for predicting the intra prediction mode from the bitstream for each PU, in a case where the PU for the intra prediction is determined by the coding unit having the tree structure. The current intra mode information may be parsed from the bit stream subsequent to the MPM flag without determining whether the left intra prediction mode and the upper intra prediction mode are the same as or different from each other. The entropy decoder 520 finishes the parsing of the block symbols including the MPM flag and the current intra mode information, and may restore the current intra prediction mode from the parsed information. The intra predictor 550 may perform the intra prediction of the current PU by using the restored current intra prediction mode and the residual data.

Figure 12:
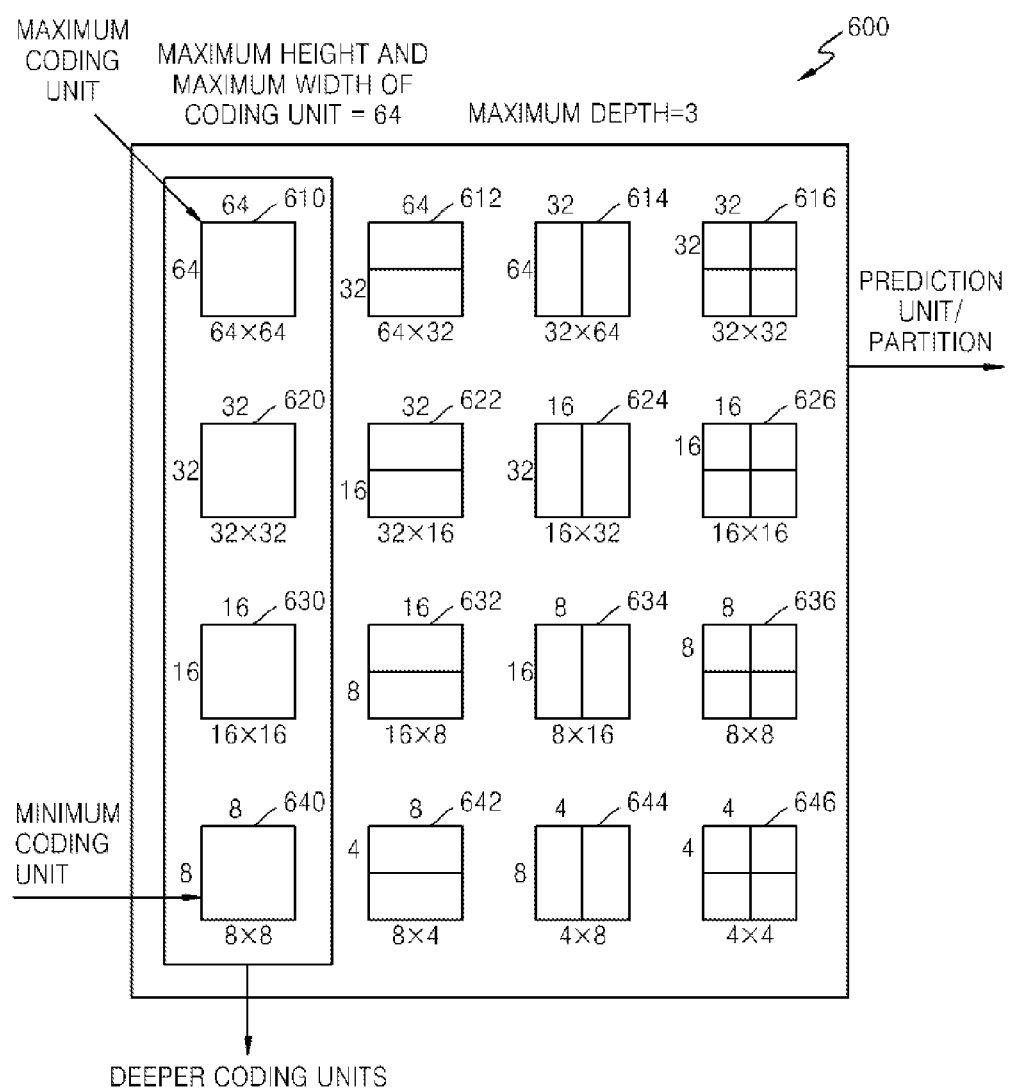
FIG. 12 is a diagram illustrating coding units and partitions according to depths, according to an exemplary embodiment.

FIG. 12 is a diagram illustrating deeper coding units and partitions according to depths, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. Here, the maximum depth denotes total splitting from the maximum coding unit to the minimum coding unit. Since a depth increases along a vertical axis of the hierarchical structure 600, a height and a width of the deeper coding unit correspond to each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by a width, is 64×64. The depth increases along the vertical axis, and a coding unit 620 having a size of 32×32 and a depth of 1, a coding unit 630 having a size of 16×16 and a depth of 2, and a coding unit 640 having a size of 8×8 and a depth of 3 exist. The coding unit 640 having the size of 8×8 and the depth of 3 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the encoding unit 610, i.e., a partition 610 having a size of 64×64, partitions 612 having a size of 64×32, partitions 614 having a size of 32×64, or partitions 616 having the size of 32×32.

Similarly, a prediction unit of the coding unit 620 having the size of 32×32 and the depth of 1 may be split into partitions included in the coding unit 620, i.e., a partition 620 having the size of 32×32, partitions 622 having a size of 32×16, partitions 624 having a size of 16×32, and partitions 626 having the size of 16×16.

Similarly, a prediction unit of the coding unit 630 having the size of 16×16 and the depth of 2 may be split into partitions included in the coding unit 630, i.e., a partition 630 having the size of 16×16 included, partitions 632 having a size of 16×8, partitions 634 having a size of 8×16, and partitions 636 having the size of 8×8.

Similarly, a prediction unit of the coding unit 640 having the size of 8×8 and the depth of 3 may be split into partitions included in the coding unit 640, i.e., a partition 640 having the size of 8×8, partitions 642 having a size of 8×4, partitions 644 having a size of 4×8, and partitions 646 having a size of 4×4.

The coding unit 640 having the size of 8×8 and the depth of 3 is the minimum coding unit and a coding unit of the lowermost depth.

To determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, to compare encoding results of the same data according to depths, the coding unit corresponding to the depth of 1 and four coding units corresponding to the depth of 2 are each encoded.

To perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth increases along the vertical axis of the hierarchical structure 600. A depth and a partition having the minimum encoding error in the coding unit 610 may be selected as the coded depth and a partition type of the coding unit 610.

FIG. 13 is a diagram for describing a relationship between a coding unit 710 and transformation units 720 according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 14 is a diagram for describing encoding information of coding units corresponding to a coded depth according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 includes information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 802 having a size of 2N×2N, the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a size of a transformation unit to be based on when transformation is performed on a current coding unit. For example, the transformation unit may be a first intra transformation unit 822, a second intra transformation unit 824, a first inter transformation unit 826, or a second intra transformation unit 828.

The image data and encoding information extractor 220 of the video decoding apparatus 200 may extract and use the information 800, 810, and 820 for decoding according to each deeper coding unit.

Figure 15:
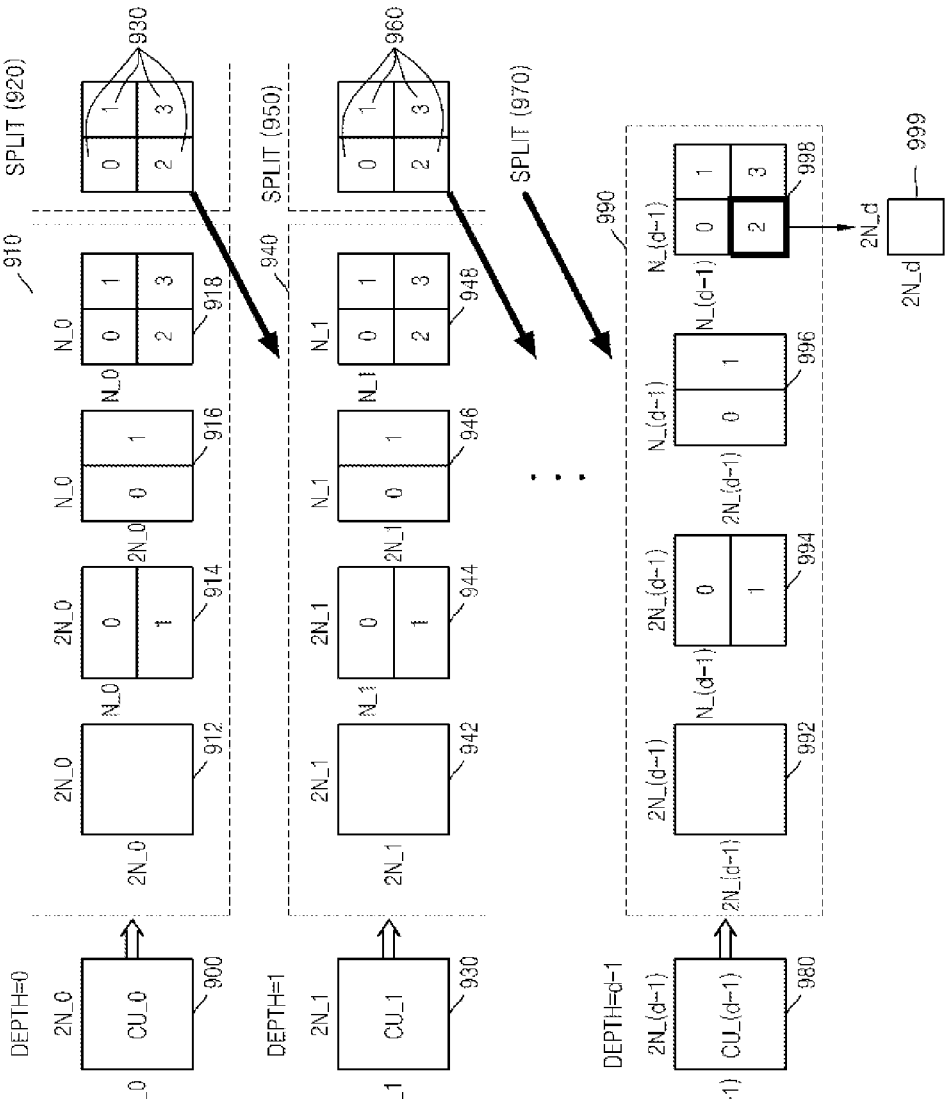
FIG. 15 is a diagram of coding units according to depths according to an exemplary embodiment.

FIG. 15 is a diagram of deeper coding units according to depths according to an exemplary embodiment.

Split information may be used to indicate a change in depth. The spilt information indicates whether a coding unit of a current depth is split into coding units of a lower depth.

A prediction unit 910 for prediction encoding a coding unit CU_0 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 15 only illustrates the partition types 912 through 918 which are obtained by symmetrically splitting the prediction unit 910, but a partition type is not limited thereto, and the partitions of the prediction unit 910 may include, for example, asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined from among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 may include partitions of a partition type 942 having a size of 2N_1×2N_1, a partition type 944 having a size of 2N_1×N_1, a partition type 946 having a size of N_1×2N_1, and a partition type 948 having a size of N_1×N_1. Here, the size of 2N_1×2N_1 of the partition type 942 is the same as the size of N_0×N_0 of the partition type 918.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d, split information for the coding unit 980 having the depth d−1 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 16:
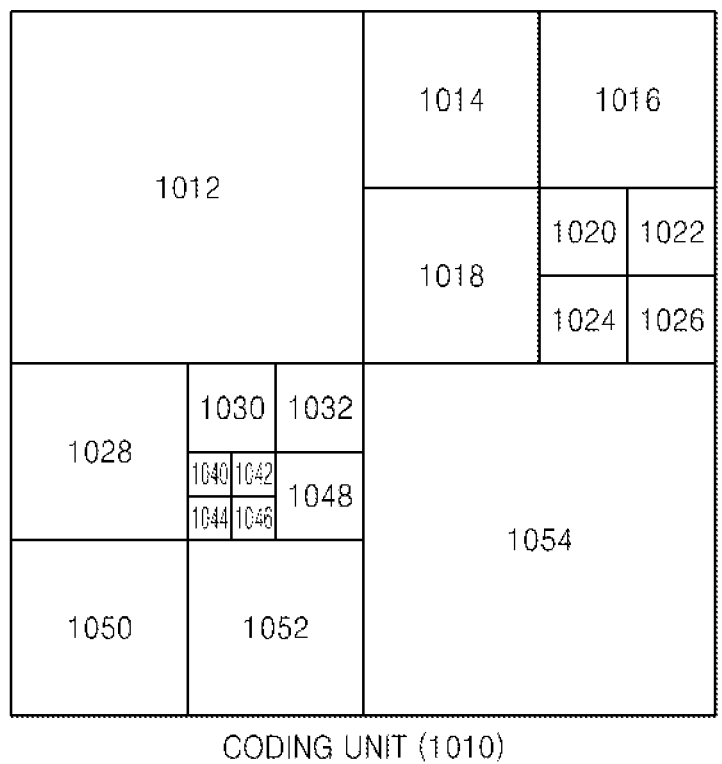
FIGS. 16 through 18 are diagrams for describing a relationship between coding units, prediction units, and transformation units according to an exemplary embodiment.
Figure 17:
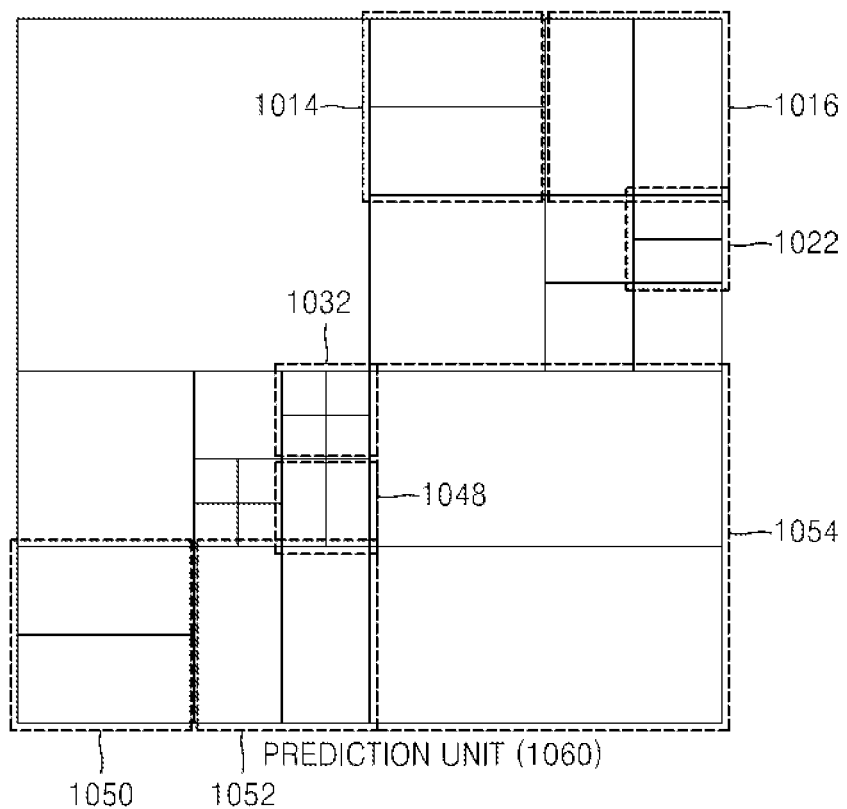
Figure 18:
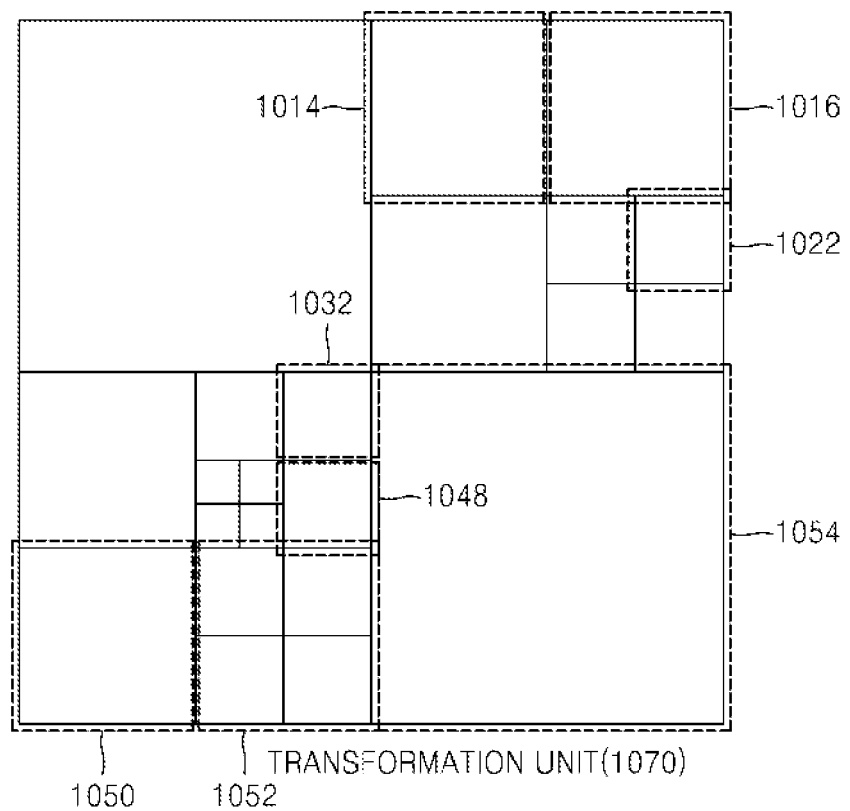

FIGS. 16 through 18 are diagrams for describing a relationship between coding units 1010, prediction units 1060, and transformation units 1070 according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the coding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | |
|---|---|---|---|---|---|
| | symmetrical Partition Type | Asymmetrical Partition Type | Split Information 0 of Transformation Unit | Split Information 1 of Transformation Unit | Split Information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d+ |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 19:
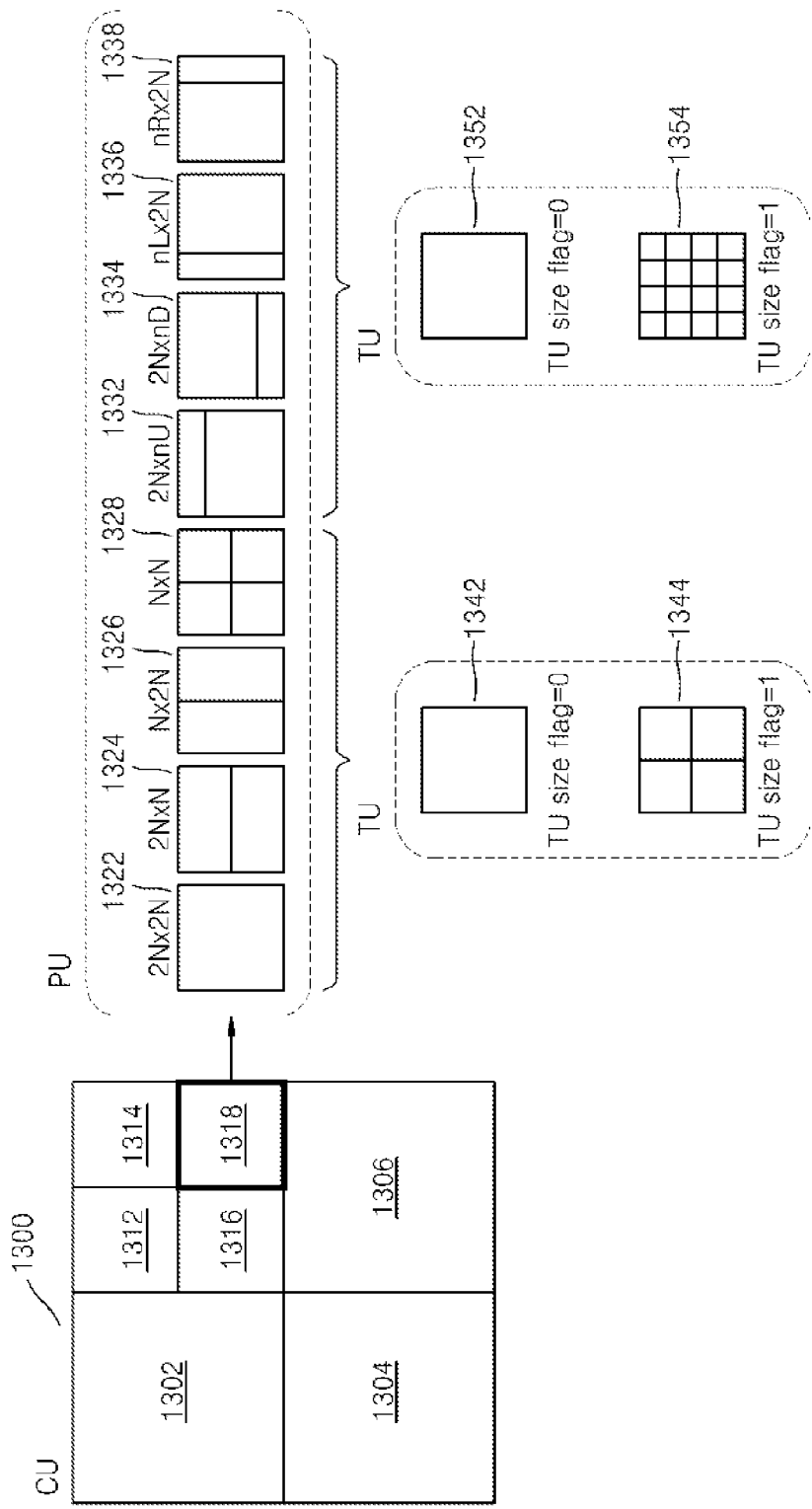
FIG. 19 is a diagram for describing a relationship between a coding unit, a prediction unit or a partition, and a transformation unit according to encoding mode information of Table 1.

FIG. 19 is a diagram for describing a relationship between a coding unit, a prediction unit or a partition, and a transformation unit according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (or TU size flag) of a transformation unit is a kind of transformation index, and the size of the transformation unit corresponding to the transformation index may vary depending on the prediction unit type of the coding unit or the partition type.

For example, when the partition type is set to be symmetrical, i.e., the partition type of sizes 2N×2N (1322), 2N×N (1324), N×2N (1326), or N×N (1328), a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type of sizes 2N×nU (1332), 2N×nD (1334), nL×2N (1336), or nR×2N (1338), a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split in a tree structure while the TU size flag increases from 0. The split information of the transformation unit may be used as an example of the transformation index.

In this case, the size of a transformation unit that has been actually used may be expressed by using a TU size flag of a transformation unit, according to an exemplary embodiment, together with a maximum size and a minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode a video by using the maximum transformation unit size information, the minimum transformation unit size information, and the maximum TU size flag.

For example, if the size of a current coding unit is 64×64 and a maximum transformation unit size is 32×32, the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is RootTuSize' when the TU size flag is 0, a current minimum transformation unit size 'CurrMinTuSize' that can be determined in a current coding unit, may be defined by Equation (1):

$$CurrMinTuSize = max(MinTransformSize, RootTuSize/(2^{\wedge}MaxTransformSizeIndex)) \quad (1)$$

Compared to the current minimum transformation unit size 'CurrMinTuSize' that can be determined in the current coding unit, a transformation unit size RootTuSize' when the TU size flag is 0 may denote a maximum transformation unit size that can be selected in the system. In Equation (1), RootTuSize/(2^MaxTransformSizeIndex)' denotes a transformation unit size obtained by splitting the maximum transformation unit size 'RootTuSize', when the TU size flag is 0, a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = min(MaxTransformSize, PUSize) \quad (2)$$

That is, if the current prediction mode is the inter mode, the transformation unit size 'RootTuSize' when the TU size flag is 0 may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and exemplary embodiments are not limited thereto.

According to the video encoding methods based on the coding units having the tree structures described with reference to FIGS. 7 through 19, the image data of the spatial domain is encoded for each coding unit having the tree structure, and the decoding is performed for each maximum coding unit according to the video decoding method based on the coding units of the tree structure to restore the image data of the spatial domain, thereby restoring the video that is the picture and the picture sequence. The restored video may be reproduced by a reproducing apparatus, stored in a storage medium, or transferred via a network.

The exemplary embodiments may be written as computer programs and may be implemented in general-use digital computers that execute the programs using a computer readable recording medium. Examples of the computer readable recording medium include magnetic storage media (e.g., read-only memory (ROM), floppy disks, hard disks, etc.) and optical recording media (e.g., compact disc read-only memories (CD-ROMs), or digital versatile discs (DVDs)).

According to video encoding and video decoding of exemplary embodiments, a constant number of candidate intra prediction modes are assumed when predicting the intra prediction mode by using the candidate intra prediction modes, and thus, the MPM flag and the current intra mode information may be parsed without considering a case where the number of candidate intra prediction modes is changed during the symbol parsing process, thereby reducing the complexity of the parsing operation.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of decoding video data controlled by a processor, the method comprising:

determining, by the processor, candidate intra prediction modes including a planar mode, in response to an intra prediction mode of a left block being equal to an intra prediction mode of an upper block and the intra prediction mode of the left block being a DC mode;

determining, by the processor, the candidate intra prediction modes including an intra prediction mode corresponding to an index that is less than an index of the intra prediction mode of the left block by 1 or an intra prediction mode corresponding to an index that is greater than the index of the intra prediction mode of the left block by 1, in response to the intra prediction mode of the left block being equal to the intra prediction mode of the upper block and the intra prediction mode of the left block being a directional mode;

obtaining, by the processor, a mode index indicating one among the candidate intra prediction modes from a bitstream;

determining, by the processor, an intra prediction mode of a current block by using the mode index; and, performing, by the processor, intra prediction on the current block using the intra prediction mode of the current block.

2. The method of claim 1, wherein the candidate intra prediction modes include the intra prediction mode of the left block, when the intra prediction mode of the left block is equal to the intra prediction mode o the upper block and the intra prediction mode of the left block is not equal to the DC mode.

* * * * *